(12) United States Patent
Bermudez-Cisneros et al.

(10) Patent No.: US 11,151,568 B2
(45) Date of Patent: Oct. 19, 2021

(54) REAL-TIME SELECTION OF AUTHENTICATION PROCEDURES BASED ON RISK ASSESSMENT

(71) Applicant: Capital One Services, LLC, McLean, VA (US)

(72) Inventors: Maria Bermudez-Cisneros, Arlington, VA (US); Darlene Schwartz, McLean, VA (US); Michelle Kelo, Chesterfield, VA (US); Nicholas Flieg, Richmond, VA (US); Adam Rubin, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 143 days.

(21) Appl. No.: 15/975,394

(22) Filed: May 9, 2018

(65) Prior Publication Data
US 2019/0347666 A1    Nov. 14, 2019

(51) Int. Cl.
*G06N 20/00* (2019.01)
*G06F 21/31* (2013.01)
(Continued)

(52) U.S. Cl.
CPC ......... *G06Q 20/4016* (2013.01); *G06F 21/31* (2013.01); *G06N 20/00* (2019.01); *G06Q 20/389* (2013.01)

(58) Field of Classification Search
CPC ......... G06Q 20/4014; G06Q 20/40145; G06Q 20/4016
See application file for complete search history.

(56) References Cited

U.S. PATENT DOCUMENTS

| 7,503,489 | B2 * | 3/2009 | Heffez | G06Q 20/32 |
| | | | | 235/380 |
| 7,908,645 | B2 * | 3/2011 | Varghese | G06F 21/552 |
| | | | | 726/4 |

(Continued)

OTHER PUBLICATIONS

Author: Sanjeev Jha, Montserrat Guillen, J. Christopher Westland. Title: Expert Systems with Applications. Date: Nov. 15, 2012, Publisher: Elsevier, vol. 39, Issue 16, pp. 12650-12657 (Year: 2012).*

(Continued)

*Primary Examiner* — Christopher Bridges
*Assistant Examiner* — Tony P Kanaan
(74) *Attorney, Agent, or Firm* — Harrity & Harrity, LLP

(57) ABSTRACT

A device may receive, from a server device, a real-time notification indicating that a field of a user account is being modified. The field may include personal information of a user associated with the user account and/or information identifying authorized users of the user account. The device may receive, from a user device, a request associated with a high-risk transaction involving the user account. The device may determine a risk score indicating a likelihood of the high-risk transaction being performed by an unauthorized user. The device may selectively identify an authentication procedure, of a group of authentication procedures, based on the risk score. The device may provide authentication instructions for the authentication procedure to the user device to allow the user device to perform the authentication procedure.

20 Claims, 11 Drawing Sheets

(51) Int. Cl.
*G06Q 20/40* (2012.01)
*G06Q 20/38* (2012.01)

(56) References Cited

U.S. PATENT DOCUMENTS

| | | | | |
|---|---|---|---|---|
| 8,453,925 | B2 | 6/2013 | Fisher et al. | |
| 8,725,613 | B1* | 5/2014 | Celka | G06Q 40/025 705/35 |
| 9,060,012 | B2* | 6/2015 | Eisen | G06Q 20/10 |
| 9,113,001 | B2* | 8/2015 | Rajakumar | G10L 17/00 |
| 9,489,674 | B2* | 11/2016 | Faith | G06Q 30/0205 |
| 9,509,702 | B2* | 11/2016 | Grigg | H04L 63/105 |
| 9,563,894 | B2* | 2/2017 | Subramanian | G06Q 20/4016 |
| 9,576,290 | B2* | 2/2017 | Subramanian | G06Q 20/4012 |
| 10,015,185 | B1* | 7/2018 | Kolman | H04L 63/1425 |
| 10,078,743 | B1* | 9/2018 | Baldi | G06N 20/00 |
| 10,158,667 | B2* | 12/2018 | Jin | G06F 21/00 |
| 10,417,637 | B2* | 9/2019 | Eisen | G06Q 20/4016 |
| 10,559,180 | B2* | 2/2020 | Pourmohammad | G06N 5/022 |
| 10,665,238 | B1* | 5/2020 | Bermudez-Cisneros | G10L 15/1822 |
| 2006/0282660 | A1* | 12/2006 | Varghese | G06Q 20/4016 713/155 |
| 2009/0083184 | A1* | 3/2009 | Eisen | G06Q 20/10 705/50 |
| 2009/0199264 | A1* | 8/2009 | Lang | G06F 21/57 726/1 |
| 2009/0210344 | A1* | 8/2009 | Lange | G06Q 20/4016 705/44 |
| 2013/0067546 | A1* | 3/2013 | Thavasi | G06F 21/32 726/7 |
| 2014/0344155 | A1 | 11/2014 | Liu et al. | |
| 2015/0095238 | A1* | 4/2015 | Khan | G06Q 20/382 705/71 |
| 2015/0095239 | A1* | 4/2015 | Specogna | G06Q 20/3224 705/72 |
| 2015/0161610 | A1* | 6/2015 | Sahadevan | G06Q 20/40145 705/44 |
| 2015/0193774 | A1* | 7/2015 | Wetzel | G06Q 50/01 705/44 |
| 2015/0213451 | A1* | 7/2015 | Santhana | G06Q 20/4016 705/44 |
| 2015/0235219 | A1* | 8/2015 | Murphy, Jr. | G06Q 20/4016 705/75 |
| 2015/0256973 | A1* | 9/2015 | Raounak | H04L 63/08 726/7 |
| 2016/0171499 | A1* | 6/2016 | Meredith | G06Q 20/3224 705/44 |
| 2017/0109509 | A1 | 4/2017 | Baghdasaryan | |
| 2017/0140174 | A1* | 5/2017 | Lacey | G06F 21/6245 |
| 2017/0195354 | A1* | 7/2017 | Kesin | H04L 63/12 |
| 2018/0027413 | A1 | 1/2018 | Hanley et al. | |
| 2018/0083939 | A1* | 3/2018 | Bowman | H04L 63/08 |
| 2018/0109507 | A1* | 4/2018 | Caldera | G06N 20/00 |
| 2018/0239923 | A1* | 8/2018 | Sand-Soll | G06F 16/22 |
| 2018/0295146 | A1* | 10/2018 | Kovega | H04L 63/1425 |
| 2018/0341760 | A1* | 11/2018 | Frempong | G06F 21/32 |
| 2019/0138512 | A1* | 5/2019 | Pourmohammad | G05B 15/02 |
| 2019/0220863 | A1* | 7/2019 | Novick | H04W 12/122 |
| 2020/0042685 | A1* | 2/2020 | Tussy | G06K 9/00892 |

OTHER PUBLICATIONS

Weili Han et al., "Dynamic combination of authentication factors based on quantified risk and benefit", https://onlinelibrary.wiley.com/doi/full/10.1002/sec.729, Feb. 22, 2013, 23 pages.

Extended European Search Report for Application No. EP19173530.7, dated Aug. 13, 2019, 9 pages.

* cited by examiner

| Example Two-Tier Authentication Selection | Example Four-Tier Authentication Selection |
|---|---|
| • Risk score satisfy threshold?<br>  • No – Require user to respond to authentication questions<br>  • Yes – Require user to provide authentication code | • Risk score in first range of risk score values?<br>  • Yes – Require user to respond to authentication questions<br>• Risk score in second range of risk score values?<br>  • Yes – Require user to provide authentication code<br>• Risk score in third range of risk score values?<br>  • Yes – Require user to provide additional form of identification<br>• Risk score in fourth range of risk score values?<br>  • Yes – Require user to perform authentication steps over two or more communication mediums |

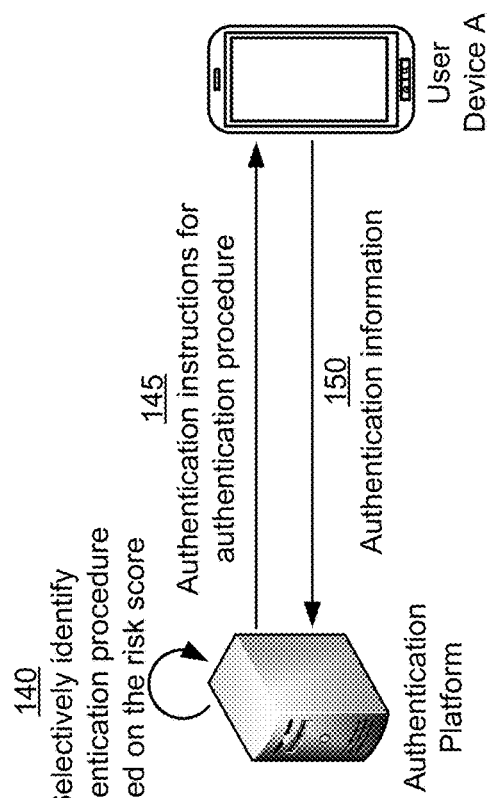

140 Selectively identify authentication procedure based on the risk score

145 Authentication instructions for authentication procedure

150 Authentication information

Authentication Platform

User Device A

FIG. 1C

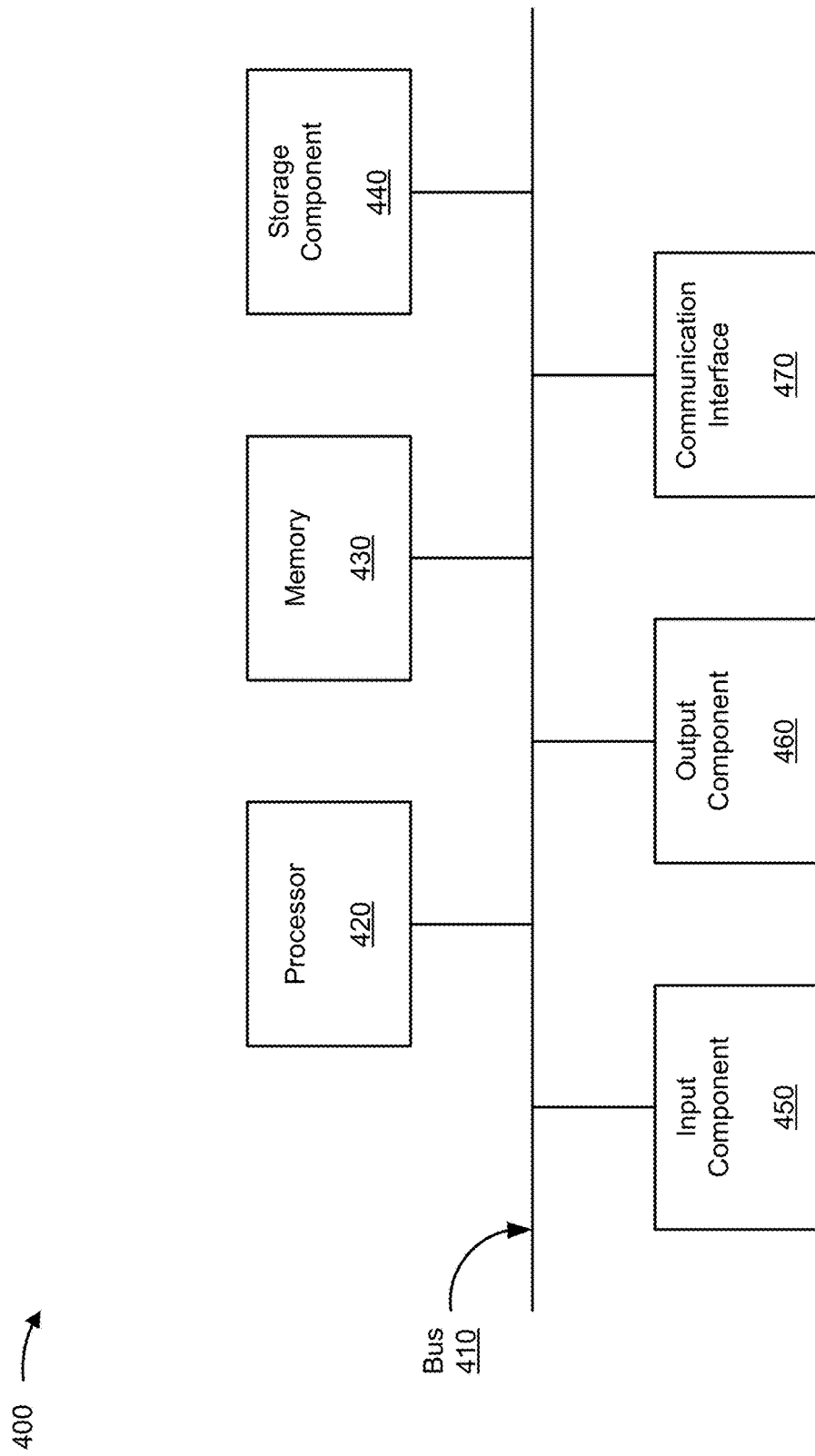

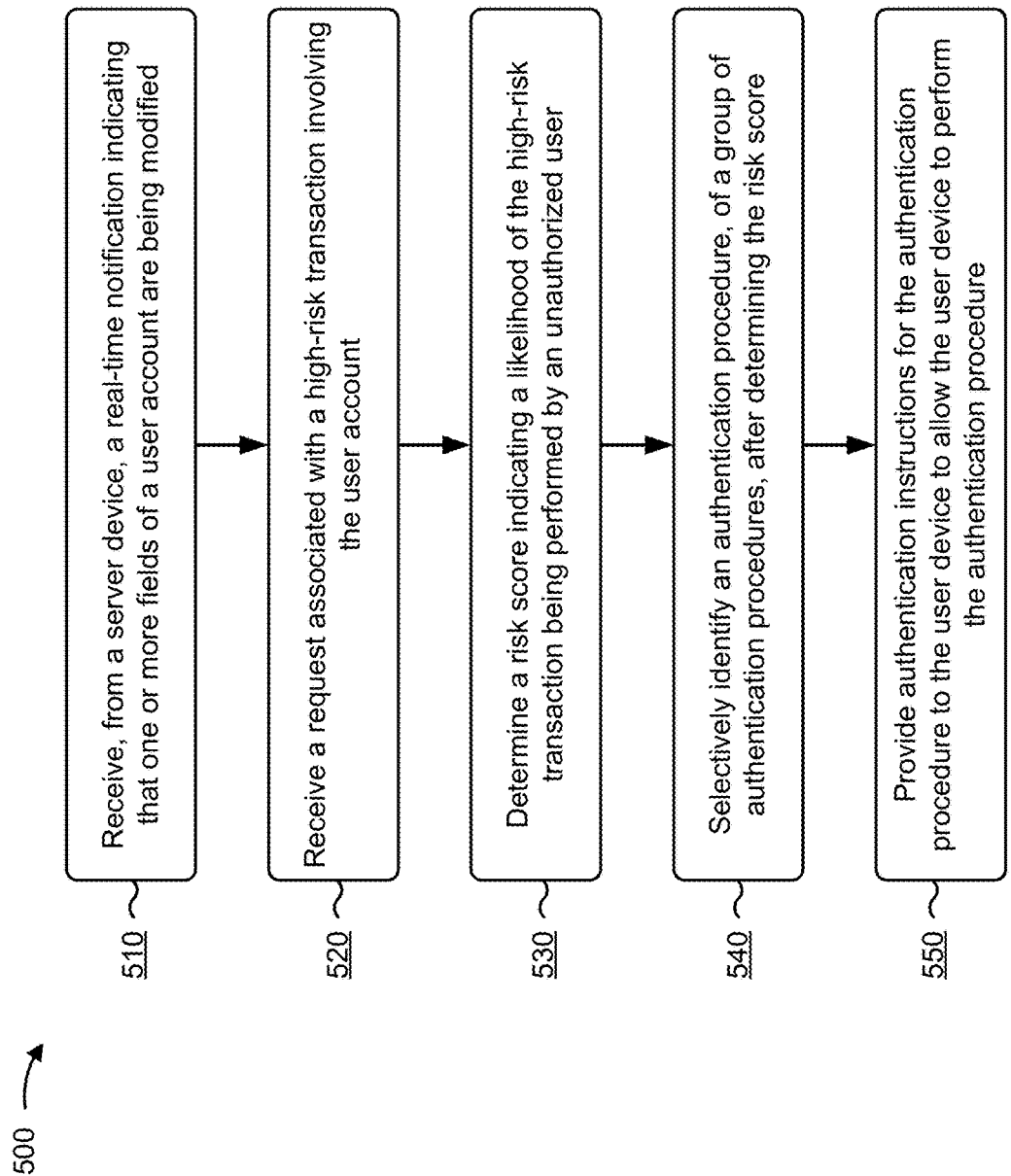

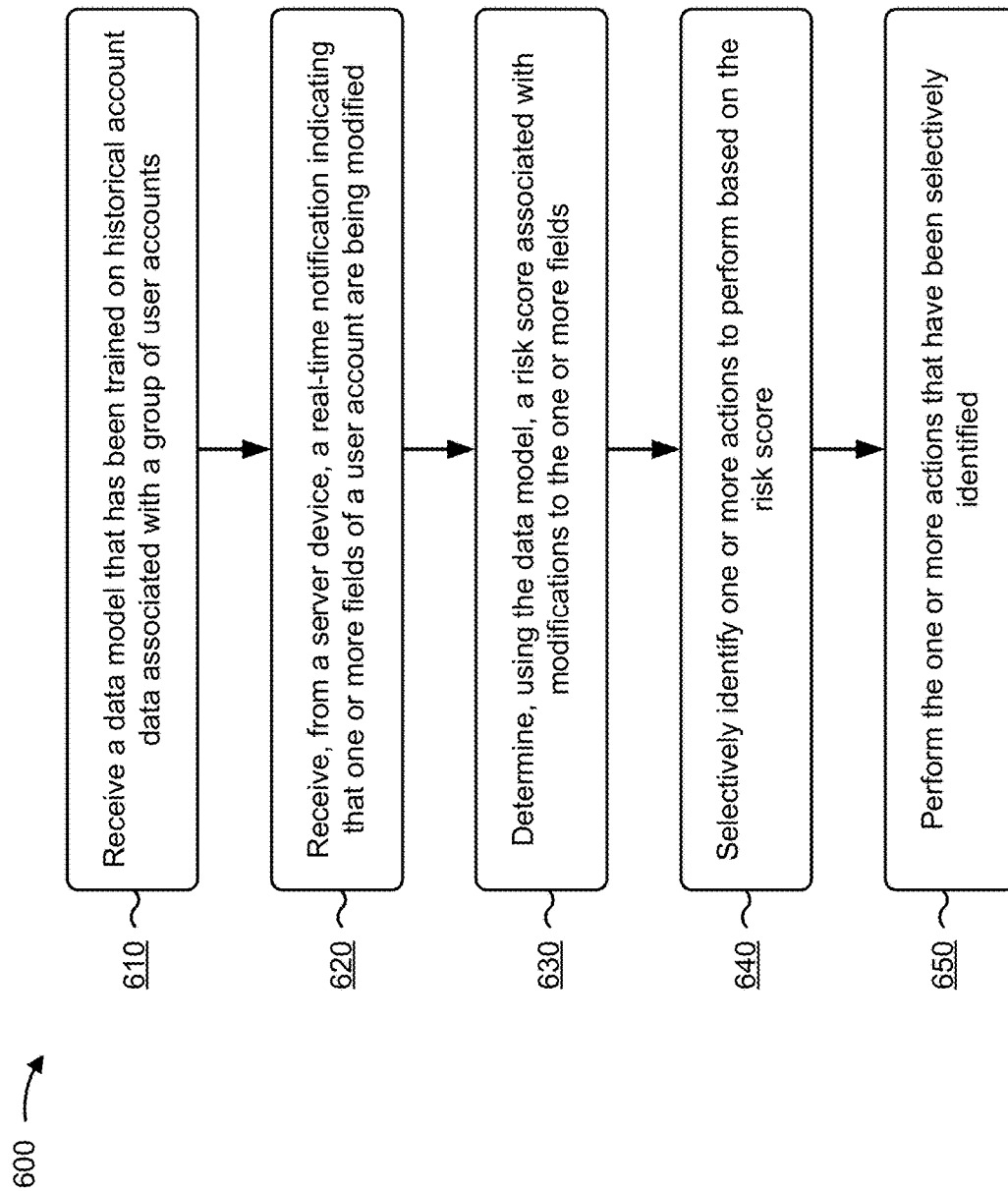

REAL-TIME SELECTION OF AUTHENTICATION PROCEDURES BASED ON RISK ASSESSMENT

BACKGROUND

Machine learning is a field of computer science that gives computers the ability to learn without being explicitly programmed. For example, a machine learning model may be trained on a set of training data, such that the model may be used to process live data to generate useful predictions and/or classifications.

SUMMARY

According to some possible implementations, a non-transitory computer-readable medium may store one or more instructions that, when executed by one or more processors, cause the one or more processors to receive, from a server device, a real-time notification indicating that one or more fields of a user account are being modified. The one or more fields that are being modified may include personal information of a user associated with the user account and/or information identifying one or more authorized users of the user account. The one or more instructions may cause the one or more processors to receive, from a user device, a request associated with a high-risk transaction involving the user account. The one or more instructions may cause the one or more processors to determine a risk score indicating a likelihood of the high-risk transaction being performed by an unauthorized user. The risk score may be determined using a data model that has been trained on historical account data associated with a group of user accounts. The one or more instructions may cause the one or more processors to selectively identify an authentication procedure, of a group of authentication procedures, after determining the risk score. The group of authentication procedures may be associated with ranges of risk scores. The authentication procedure may be identified based on the risk score falling within a particular range of risk scores of the ranges of risk scores. The one or more instructions may cause the one or more processors to provide authentication instructions for the authentication procedure to the user device to allow the user device to perform the authentication procedure.

According to some possible implementations, a device may receive a data model that has been trained on historical account data associated with a group of user accounts. The historical account data may include data associated with fraudulent transactions and data associated with legitimate transactions. The device may receive, from a server device, a real-time notification indicating that one or more fields of a user account are being modified. The one or more fields that are being modified may include personal information of a user associated with the user account and/or information identifying one or more authorized users of the user account. The device may determine, using the data model, a risk score associated with modifications to the one or more fields. The information associated with the real-time notification may be provided as input to the data model to cause the data model to output the risk score. The risk score may indicate a likelihood of the one or more fields being modified as part of an unauthorized use of the user account. The device may selectively identify one or more actions to perform based on the risk score. The one or more actions may include a first group of one or more actions to determine whether the modification of the one or more fields is an unauthorized action and/or a second group of one or more actions to prevent subsequent unauthorized access to the user account. The device may perform the one or more actions that have been selectively identified.

According to some possible implementations, a method may include receiving, by a device and from a server device, a real-time notification indicating that one or more fields of a user account are being modified. The one or more fields that are being modified may include personal information of a user associated with the user account and/or information identifying one or more authorized users of the user account. The method may include determining, by the device, a set of risk scores associated with modification of the one or more fields of the user account. The set of risk scores may be determined using a data model that has been trained on historical account data associated with a group of user accounts. The set of risk scores may indicate a likelihood of the one or more fields being modified as part of an unauthorized use of the user account. The method may include receiving, by the device and from a user device, a request associated with a high-risk transaction involving the user account. The method may include selectively identifying, by the device, an authentication procedure, of a group of authentication procedures, after receiving the request. The authentication procedure may be identified based on a risk score, of the set of risk scores, that is associated with an amount of time between receipt of the real-time notification and receipt of the request associated with the high-risk transaction. The method may include providing, by the device, authentication instructions for the authentication procedure to the user device to allow the authentication procedure to be completed.

BRIEF DESCRIPTION OF THE DRAWINGS

FIGS. 1A-1D are diagrams of an overview of an example implementation described herein;

FIG. 4 is a diagram of example components of one or more devices of FIG. 3;

FIG. 5 is a flow chart of an example process for determining a risk score that identifies a likelihood of fraudulent use associated with a user account, and selectively identifying and providing a user device with an authentication procedure that is based on the risk score; and FIG. 6 is a flow chart of an example process for determining a risk score that identifies a likelihood of fraudulent use associated with a user account, and, based on the risk score, selectively identifies and performs actions associated with prevention of fraudulent use of the user account.

DETAILED DESCRIPTION

Figure 1A:
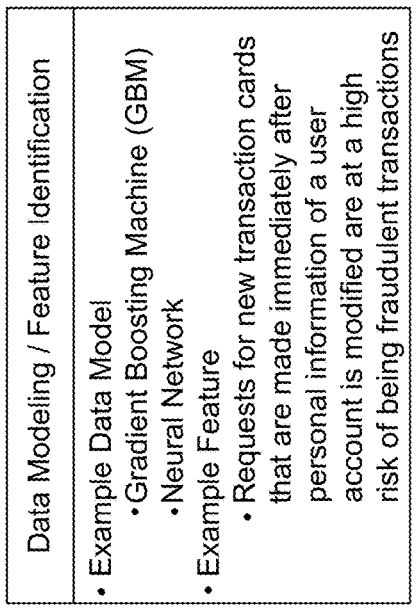
Figure 1A:
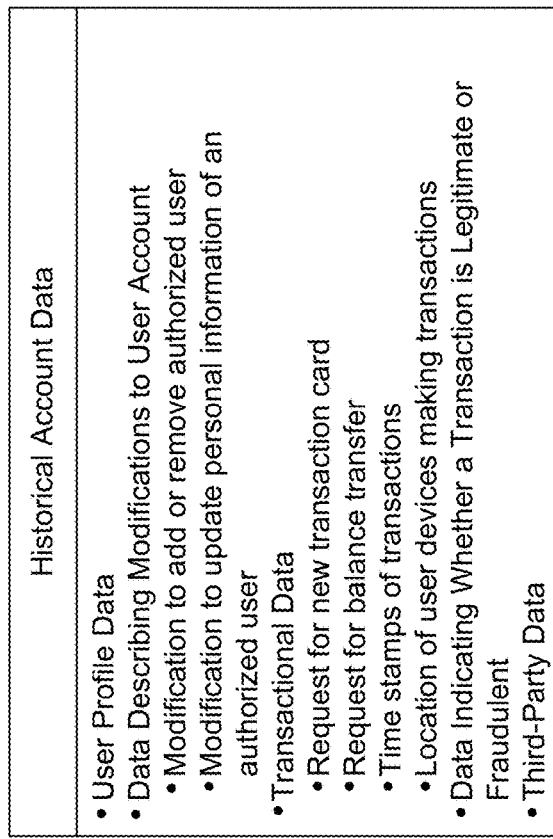
Figure 1A:
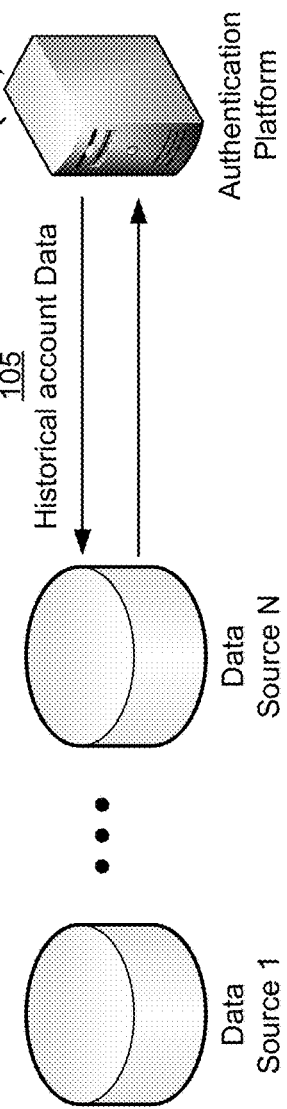

The following detailed description of example implementations refers to the accompanying drawings. The same reference numbers in different drawings may identify the same or similar elements.

A fraudulent transaction is a transaction that is not made by or on behalf of an authorized user. A high-risk transaction may refer to a transaction that may be used to access funds of a user account. For example, a high-risk transaction may be a request for a new transaction card (e.g., a request to replace a transaction card that is expired or lost), a request to modify a pin needed to access a transaction card, a request for an account balance transfer, and/or the like.

To prevent and/or deter unauthorized users from engaging in fraudulent transactions, an organization may deploy more stringent authentication procedures when a user is making a request associated with a high-risk transaction. For example, if a user is making a request associated with a low-risk transaction, the user may be asked to answer one or more security questions. If the user is making a request associated with a high-risk transaction, the user may be required to provide a dynamically generated authentication code that is to be provided to an authorized user device or electronic mailing address associated with an authorized user.

However, the authentication procedure utilized may not prevent fraud if an unauthorized user has already obtained access to a user account. For example, an unauthorized user may be able to request a high-risk transaction by modifying one or more fields of the user account with which they are trying to access. As an example, assume an unauthorized user has access to personal information of an authorized user, such that the unauthorized user may be able to use the personal information to activate a new transaction card. In this case, the unauthorized user may modify a preferred mailing address to a new address that is accessible to the unauthorized user, which may allow the unauthorized user to request that the new transaction card be sent to the new address.

As another example, assume that transferring an account balance requires a user requesting the transfer to provide an authentication code that is to be sent to an electronic mailing address of an authorized user. In this case, to obtain the authentication code, an unauthorized user may modify the electronic mailing address of the authorized user to an electronic mailing address of the unauthorized user, which may allow the unauthorized user to obtain the authentication code needed to complete the account balance transfer.

Furthermore, broadly deploying more stringent authentication procedures to all requests associated with high-risk transactions utilizes an excessive amount of processing resources and/or network resources of devices tasked with carrying out the authentication procedure. For example, if an authorized user calls in to request a new transaction card, a server device may have to dynamically generate an authentication code that is to be used as part of a more stringent authentication procedure, transmit the authentication code to a user device, which may allow the user device to provide a copy of the authentication code to the server device to complete the authentication procedure. This utilizes processing resources and/or network resources that would not be needed had a less stringent authentication procedure been deployed (e.g., an authentication procedure that asks the user a security question).

Additionally, broadly deploying the more stringent authentication procedures to all requests associated with high-risk transactions reduces an overall customer experience of an authorized user by forcing the authorized user to perform additional authentication, by delaying a time needed to satisfy the user's request, and/or the like.

Some implementations described herein provide an authentication platform to selectively identify and provide a user device with an authentication procedure that is based on a risk of fraudulent use associated with a user account. For example, a server device may monitor real-time modifications to fields of a user account, and may provide, to the authentication platform, a real-time notification when one of the fields is being modified. The one or more fields may be fields that historically have been found to be modified during fraudulent transactions, and may include personal information of a user authorized to access the user account (e.g., an address, contact information, etc.), information identifying the authorized user, and/or the like.

Additionally, the authentication platform may receive a request associated with a high-risk transaction involving the user account. In this case, the authentication platform may use a machine learning model (referred to herein as a data model) to determine a risk score indicating a likelihood of the request being made by an unauthorized user. The data model may determine the risk score based on trends associated with fraudulent transactions and/or legitimate transactions, as described further herein.

Additionally, the authentication platform may selectively identify an authentication procedure, of a group of authentication procedures, based on the risk score. For example, the authentication platform may be configured with a group of authentication procedures that are each associated with ranges of risk scores, may determine that the risk score falls within a particular range of risk scores, and may identify an authentication procedure that is associated with the particular range of risk scores. Furthermore, the authentication platform may provide authentication instructions for the authentication procedure to the user device to permit the user device to authenticate the request associated with the high-risk transaction.

By intelligently selecting an authentication procedure that is based on a risk of fraudulent use of the user account, the authentication platform is able to prevent and/or deter fraudulent transactions without burdening authorized users with unnecessary authentication procedures. Additionally, the authentication procedure is able to provide tailored authentication to customers, such that customers with different service plans, different levels of accessibility to certain types of technology, and/or the like, may still be able to utilize the added security provided by the authentication platform. To provide a few examples: if a user has a camera-less phone, the authentication platform may not consider authentication procedures that require a camera, if a user does not have access to Internet, the authentication platform may not consider authentication procedures that require use of the Internet, and/or the like. Furthermore, the authentication platform reduces a utilization of processing resources and/or network resources relative to an inferior platform that uses the same authentication procedure for all requests associated with high-risk transactions. For example, if the authentication platform determines that the risk of fraud is low, the authentication platform may select an authentication procedure that is less processing intensive than would otherwise be selected by the inferior platform.

Additionally, by deterring fraudulent transactions associated with the user account, the authentication platform conserves processing resources that might otherwise be used to generate reports of incidents of fraud, conserves processing resources that might be used to generate alerts of incidents of fraud, conserves processing resources that might be used to generate reimbursements and/or notifications of reimbursement for customer devices after incidents of fraud, and/or the like.

Additionally, the authentication platform conserves network resources that might otherwise be used to provide reports of incidents of fraud to one or more devices, conserves network resources that might be used to provide alerts of incidents of fraud to one or more devices, conserves network resources that might be used to provide reimbursements and/or notifications of reimbursement to one or more devices, and/or the like. Furthermore, the authentication platform conserves memory resources that might be used to store reports of incidents of fraud, conserves memory resources that might be used to store alerts of incidents of fraud, conserves memory resources that might be used to store reimbursement information and/or notifications of reimbursements associated with fraud, and/or the like.

FIGS. 1A-1D are diagrams of an overview of an example implementation 100 described herein. For example, example implementation 100 may include an authentication platform to selectively identify and provide a user device (shown as User Device A) with an authentication procedure that is selected based on a risk of fraudulent use associated with a user account.

As shown in FIG. 1A, and by reference number 105, the authentication platform may obtain, from one or more data sources (shown as Data Source 1 through Data Source N), historical account data associated with a group of user accounts. For example, the authentication platform may obtain historical account data by making an application programming interface (API) call to search (e.g., query) the one or more data sources for the historical account data. Additionally, or alternatively, the one or more data sources may be configured to automatically provide the historical account data to the authentication platform.

The historical account data may include user profile data, data describing modifications to the group of user accounts, transactional data describing transactions associated with the group of user accounts, data describing whether a transaction was legitimate or fraudulent, third-party data, and/or the like.

The user profile data may include data identifying a user that is authorized to access a user account (e.g., a name, a username, etc.), data describing personal information of the authorized user (e.g., an address, a phone number, an e-mail address, etc.), demographic information of the authorized user (e.g., age, gender, location, etc.), and/or the like. The data describing the modifications to the user account may include data describing a modification to add or remove an authorized user from the user account, data describing a modification to the personal information of the authorized user (e.g., by modifying the name, the address, the phone number, the e-mail address, etc.), and/or the like. The transactional data may include data describing a particular transaction (e.g., a transaction to withdraw funds, a transaction to request a new transaction card, etc.), data identifying a time at which the particular transaction was made, data identifying a user device performing the particular transaction (e.g., a device identifier, such as an internet protocol (IP) address), data identifying a location of the user device when performing the particular transaction, and/or the like. The third-party data may include historical information relating to users, such as previous user addresses, previous phone numbers, device information for old user devices, social media data (e.g., data that may be found on a social media account of a user), data capable of identifying credit mules, and/or the like.

In some implementations, before the authentication platform obtains the historical account data, a group of user devices may register for user accounts, which may cause user profile data to be provided to the one or more data sources. In some implementations, as the group of user devices are used to modify user accounts, the data describing the modifications may be provided to the one or more data sources. Additionally, or alternatively, as the group of user devices are used to access the user accounts for particular transactions, the transactional data describing the transactions may be provided to the one or more data sources.

Additionally, or alternatively, if transactions are reported as fraudulent transactions, data identifying the transaction as fraudulent may be provided to the one or more data sources. In this case, if transactions are not reported as fraud, data associated with those transactions may be provided to the one or more data sources and stored with an identifier indicating that the transactions are legitimate.

In some implementations, the one or more data sources may store the historical account data. For example, the one or more data sources may store the historical account data using a data structure, such as an array, a linked-list, a relational database, a tree, a graph, and/or the like. Additionally, the one or more data sources may store millions, billions, or more, of data points relating to the historical account data, such that a human or an inferior data source would be objectively unable to process the data points.

As shown by reference number 110, the authentication platform may train a data model on the historical account data. For example, the authentication platform may train a data model using a supervised machine learning technique (e.g., a gradient boosting technique), a clustering technique, a dimensionality reduction technique, a structured prediction technique, an anomaly detection technique, a technique utilizing a neural network, a reinforcement learning technique, and/or the like.

In some implementations, the authentication platform may train a data model to generate risk scores that are able to predict a likelihood of interactions with user accounts being fraudulent interactions. For example, the authentication platform may train a data model to predict a likelihood of a request for a high-risk transaction being a fraudulent request, a likelihood of a modification to a user account being performed by an unauthorized user (e.g., which may be needed to subsequently perform a high-risk transaction), and/or the like. In this case, the authentication platform may process the historical account data to identify features associated with fraudulent transactions and/or features associated with legitimate transactions. The features may be based on trends or reoccurring interactions with user accounts that are found in fraudulent transactions and/or legitimate transactions.

As an example, the authentication platform may identify a trend indicating that a high-risk transaction (e.g., a request for a new transaction card, an account balance transfer, etc.) has a high risk of being a fraudulent transaction if personal information of an authorized user is updated within a threshold time period of a user device submitting the request for the high-risk transaction. This trend may be caused by authentication requirements associated with high-risk transactions. For example, to request a new transaction card, an unauthorized user may be required to submit an authentication code that is sent to a registered e-mail of the authorized user. To obtain the authentication code, the unauthorized user may first attempt to modify the e-mail address of the authorized user to an e-mail address that is accessible to the unauthorized user.

As another example, the authentication platform may identify a trend indicating that a high-risk transaction has a high risk of being a fraudulent transaction if an authorized user is added or removed within a threshold time period of the user device submitting a request for the high-risk transaction. This trend may also be caused by authentication requirements associated with high-risk transactions. For example, to add a new authorized user, an unauthorized user may be required to submit an authentication code and/or other personal information associated an authorized user. To obtain the authentication code and/or the other personal information associated with the authorized user, the unauthorized user may first attempt to modify an e-mail address, a home address, and/or the like, to an e-mail address or home address that is accessible to the unauthorized user.

Continuing with the above examples, the authentication platform may identify a trend associated with a time between the modification of the user account (e.g., the modification to the personal information, the modification to the list of authorized users, etc.) and the time at which the request associated with the high-risk transaction is submitted. For example, the authentication platform may identify a trend indicating that the more time that passes after the user account is modified, the less likely a subsequent request associated with a high-risk transaction is to be made by an unauthorized user.

As another example, the authentication platform may identify a trend associated with a degree to which a user account is modified. For example, the authentication platform may identify a trend indicating that minor modifications to the user account are less likely to be made by unauthorized users (e.g., a minor modification may simply be correcting a typographical error in an address or an e-mail). Conversely, the authentication platform may identify a trend indicating that significant modifications to the user account are more likely to be made by unauthorized users, and even more so when a request associated with a high-risk transaction is made immediately after the modification.

As another example, the authentication platform may identify one or more additional trends indicating that a request associated with a high-risk transaction has a low likelihood of being performed by an unauthorized user if the request is made from a device that is registered to the authorized user, if the request is made from a geographic location associated with a current listed address of the authorized user, if the user account has not recently been modified, and/or the like. As such, the authentication platform is able to identify trends that may be used as features for training the data model.

Additionally, the authentication platform may assign risk scores to the features, such that a scored feature is able to be used as an indicator of a fraudulent transaction or an indicator of a legitimate transaction. For example, the authentication platform may assign higher risk scores to features of fraudulent transactions and lower risk scores to features of legitimate transactions. In this way, the authentication platform trains the data model to be able to receive real-time data, and to process the real-time data to generate an overall risk score indicating a likelihood of the real-time data being associated with a fraudulent use of the user account, as described further herein.

In some implementations, a device other than the authentication platform may train the data model. For example, a device other than the authentication may train the data model, and may provide the trained data model to the authentication platform.

In this way, the authentication platform is able to train a data model on the historical account data.

Figure 1B:
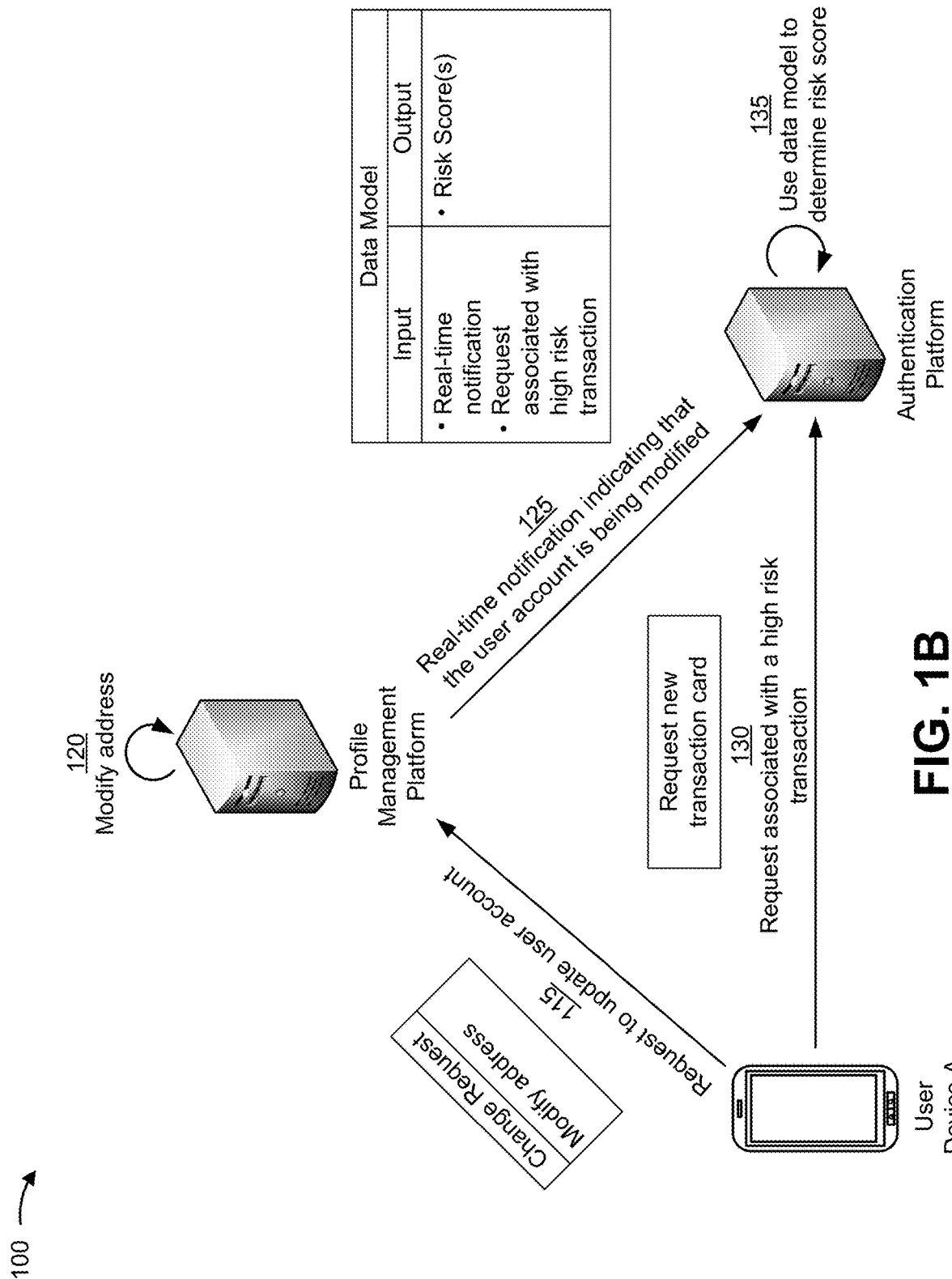

As shown in FIG. 1B, and by reference number 115, the user device (shown as User Device A) may provide a request to update a user account to a profile management platform. The request may be made by calling a 1-800 number, by submitting an e-mail, by logging into a secure environment (e.g., an online banking webpage), and/or the like. As shown as an example, the user device may provide a request to modify an address of an authorized user. Authorized user, as described herein, may refer to a primary cardholder, a user granted access to use the transaction card by the primary cardholder, and/or the like.

As shown by reference number 120, the profile management platform may modify the address of the authorized user based on receiving the request. For example, an authorized user may move to a new area, and may submit a request to modify the user's address to a new address. As another example, an unauthorized user may call a 1-800 number to make a request to modify the address. In this case, the unauthorized user may be requesting to modify the address as part of a fraudulent attempt to request a new transaction card that may be subsequently activated and used to obtain access to funds associated with the user account.

As shown by reference number 125, the profile management platform may provide, to the authentication platform, a real-time notification indicating that the user account is being modified. For example, the profile management platform may, using an application programming interface (API), provide a real-time notification indicating that a request is being made to modify the address of the authorized user.

As shown by reference number 130, the user device may provide, to the authentication platform, a request associated with a high-risk transaction. In some cases, the high-risk transaction may be a servicing transaction (e.g., a request to set up a new transaction card, a request for an account balance transfer, and/or the like). As shown as an example, the user device may provide a request for a new transaction card. Continuing with the above examples, the authorized user may have misplaced his or her transaction card while moving to the new area, which may cause the authorized user to submit the request for the new transaction card. Alternatively, the unauthorized user may submit the request for the new transaction card as part of the attempt to obtain access to funds associated with the user account.

As shown by reference number 135, the authentication platform may use the data model to determine a risk score. For example, the authentication platform may provide information associated with the real-time notification and information associated with the request as input to the data model to cause the data model to output the risk score. In this case, the risk score may indicate a likelihood of the request being a fraudulent transaction. In some cases, a primary factor in determining the risk score may be a time period between receipt of the real-time notification and receipt of the request associated with the high-risk transaction.

In some implementations, the authentication platform may use the data model to determine a set of risk scores prior to receiving a request associated with a high-risk transaction. For example, the data model may be trained to associate a set of risk scores with a set of time ranges indicating estimated times at which the user device might perform a high-risk transaction. In this case, the authentication platform may provide the information associated with the real-time notification as input to the data model, which may cause the data model to output risk scores for each estimated time at which the user device might perform the high-risk transaction.

As an example, assume the data model is trained to associate one hundred different risk scores with one hundred estimated times at which the user device might perform a high-risk transaction. In this case, the authentication platform may provide the information associated with the real-time notification as input to the data model, which may cause the data model to output one hundred different risk scores that are associated with the one hundred estimated times at which the user device might perform the high-risk transaction. As a particular example, a risk score may be a high risk score if an estimated time at which the user device might perform the high-risk transaction is less than an hour after receiving the real-time notification, and a risk score may be a low risk score if an estimated time at which the user device might perform the high-risk transaction is more than a month after receiving the real-time notification.

In some cases, the authentication platform may determine the set of risk scores during time periods where network traffic is low. For example, the authentication platform may determine the set of risk scores between the hours of 2:00 AM and 6:00 AM, thereby reducing a utilization of processing resources during time periods where network traffic is high (e.g., between 9:00 AM and 5:00 PM).

Additionally, or alternatively, the authentication platform may identify a total usage of resources (e.g., cloud resources), and may determine the set of risk scores if the total usage of resources satisfies a threshold value (e.g., such that enough resources are available to make the determination without negatively influencing any of the other services provided by the authentication platform). By intelligently selecting an optimal time to determine the set of risk scores, the authentication platform efficiently and effectively utilizes network resources.

Furthermore, determining the set of risk scores prior to receiving a request associated with the high-risk transaction reduces a utilization of processing resources and/or network resources when a request is actually made. For example, if the user device submits a request associated with a high-risk transaction, the authentication platform may simply look at a first time stamp of the real-time notification, a second time stamp of the request associated with the high-risk transaction, and may select a risk score that is associated with a time period that matches a time period between the first time stamp and the second time stamp. This reduces a utilization of processing resources and/or network resources when the request is made because the authentication platform does not need to make a real-time determination of the risk score.

In some implementations, the authentication platform may determine a risk score using a data model that has been trained on additional historical data, such location information of user devices at times when transactions are made, vendors associated with the transactions (e.g., which vendors are the users interacting with to make particular purchasing decisions), transaction amounts, and/or the like. For example, assume that instead of submitting a request associated with the high-risk transaction, that an unauthorized has already obtained the transaction card of the authorized user.

In this case, the unauthorized user may attempt to use the transaction card to make a purchase, which may cause the profile management platform to provide, to the authentication platform, an indication that a transaction has been made. Additionally, the authentication platform may provide information associated with the transaction as input to the data model to cause the data model to output a risk score. To provide a few examples, the risk score may indicate a high likelihood of the transaction being a fraudulent transaction if the user device made the transaction from a location that is not within a threshold range of a geographic area in which the user device ordinarily makes purchases, if the transaction is of an amount that is much larger than transactions that the user device has historically made, if the user device is making a purchase with a vendor from which the authorized user has never done business, and/or the like.

In this way, the authentication platform is able to determine a risk score that may be used to selectively identify an authentication procedure, as described further herein.

As shown in FIG. 1C, and by reference number 140, the authentication platform may selectively identify an authentication procedure based on the risk score. For example, the authentication platform may be configured with a group of authentication procedures that are stored in association with ranges of risk scores. In this case, the authentication platform may compare the risk score to the ranges of risk scores, may identify that the risk score falls within a particular range of risk scores, and may select the authentication procedure associated with the particular range of risk scores.

In some implementations, the authentication platform may be configured with a first authentication procedure. For example, the authentication platform may be configured with an authentication procedure that is able to authenticate the request associated with the high-risk transaction by providing the user device with authentication questions relating to the user or the user account. The authentication questions may include a question asking for an authorized user's date of birth, a mother's maiden name, a social security number, and/or the like. In this case, a response to the authentication questions may be provided back to the authentication platform, and the first authentication procedure may be completed if the correct responses are provided.

Additionally, or alternatively, the authentication platform may be configured with a second authentication procedure. For example, the authentication platform may be configured with a second authentication procedure that is able to authenticate the request associated with the high-risk transaction by requiring the user device to submit an authentication code. In this case, the authentication platform may provide authentication instructions to the user device, which may indicate that an authorization code has been sent to an authorized user device and/or an e-mail address registered to an authorized user. As such, the authentication code may be obtained from the authorized user device and/or the e-mail address registered to the authorized user, and may be submitted back to the authentication platform to complete the second authentication procedure.

Additionally, or alternatively, the authentication platform may be configured with a third authentication procedure. For example, the authentication platform may be configured with a third authentication procedure that is able to authenticate the request associated with the high-risk transaction by requiring the user to provide an additional form of identification. In this case, the authentication platform may provide authentication instructions to the user device, which may include instructions indicating that the user is to provide a form of user identification, such as an image of the user's face, a fingerprint, a voice recording, an image of a driver's license, and/or the like. As such, the third authentication procedure may be completed if the user submits identification of an authorized user.

Additionally, or alternatively, the authentication platform may be configured with a fourth authentication procedure. For example, the authentication platform may be configured with a fourth authentication procedure that is able to authentication the request associated with the high-risk transaction by requesting authentication over two or more communication mediums.

As an example, the authentication platform may provide a first authentication code to an authorized user device (e.g., via a text message), and may provide a second authentication code to an e-mail address of the authorized user. As another example, the authentication platform may provide a first authentication question to the user device, and may provide a second authentication question to an e-mail address of the authorized user. In each of these cases, the fourth authentication procedure may be completed by satisfying the authentication requirements (e.g., by submitting the two authentication codes, by submitting correct responses to the authentication questions, etc.).

While four authentication procedures are provided herein, it is to be understood that the four authentication procedures are provided merely as an example. In practice, any number of authentication procedures may be configured and utilized to carry out one or more implementations described herein.

In some implementations, the authentication platform may selectively identify the authentication procedure using an N-tier authentication selection process. For example, the authentication platform may determine whether the risk score satisfies a first threshold value, a second threshold value, . . . , an Nth threshold value, until the authentication platform identifies that the risk score falls within a particular range of risk scores.

As shown as an example, the authentication platform may selectively identify the authentication procedure using a two-tier authentication selection process. For example, the authentication platform may determine whether the risk score satisfies a threshold value, and may select an authentication procedure based on whether the risk score satisfies the threshold value. In this example, if the risk score does not satisfy the threshold value, the authentication platform may select an authentication procedure that requires the user to respond to authentication questions. If the risk score satisfies the threshold value, the authentication platform may select an authentication procedure that requires the user to submit an authentication code.

As shown as an additional example, the authentication platform may selectively identify the authentication procedure using a four-tier authentication selection process. For example, the authentication platform may determine whether the risk satisfies a first threshold value, a second threshold value, a third threshold value, and a fourth threshold value, until the authentication platform identifies that the risk score falls within a particular range of risk scores.

In this example, if the risk scores satisfies the first threshold value, the authentication platform may select an authentication procedure that requires the user to respond to authentication questions. If the risk score satisfies the second threshold value, the authentication platform may select an authentication procedure that requires the user to submit an authentication code. If the risk score satisfies the third threshold value, the authentication platform may select an authentication procedure that requires the user to provide an additional form of identification. If the risk score satisfies the fourth threshold value, the authentication platform may select an authentication procedure that requires the user to perform authentication steps over two or more communication mediums.

In some implementations, the authentication platform may selectively identify the authentication procedure based on a risk score of a set of risk scores. For example, assume that the authentication platform determines a set of risk scores prior to receiving the request associated with the high-risk transaction, as described above. In this case, the authentication platform may identify a time period between receipt of the notification indicating that the user account was modified and receipt of the request associated with the high-risk transaction. Additionally, the authentication platform may compare the time period to the set of time ranges indicating estimated times at which the user device might perform a high-risk transaction, and may determine that the identified time period falls within a particular time range. As such, the authentication platform may identify the risk score associated with the particular time range, and may select the authentication procedure that is stored in association with the risk score.

In some implementations, the authentication platform may selectively identify an authentication procedure in a non-linear manner. For example, within a particular risk score or range of risk scores, the authentication platform may selectively identify a particular authentication procedure based on the input data that was used to generate the risk score. As an example, the data model may consider four different factors in determining risk score X, and in another case, may consider one factor in determining the same risk score X. However, it may be the case that the same or similar risk scores warrant utilization of different authentication procedures depending on the reasoning behind the risk score. Additionally, as described elsewhere herein, the data model may be retrained to determine more accurate risk scores over time, thereby allowing more granular selection of authentication procedures to be performed.

As shown by reference number 145, the authentication platform may provide authentication instructions for the authentication procedure to the user device. For example, the authentication platform may provide authentication instructions for one or more of the above described authentication procedures.

As shown by reference number 150, the authentication platform may receive authentication information from the user device. For example, if the authentication procedure is to respond to authentication questions, the authentication information may include responses made by the user. As another example, if the authentication procedure is to provide an authentication code, the authentication information may be the authentication code.

By selectively identifying an authentication procedure based on the risk score, the authentication platform is able to select a best-available authentication procedure, thereby conserving processing resources by only requiring more stringent authentication if a risk of fraud is high. In this way, the authentication platform is able to effectively balance providing a sufficient amount of security without subjecting authorized users to frivolous authentications.

Figure 1D:
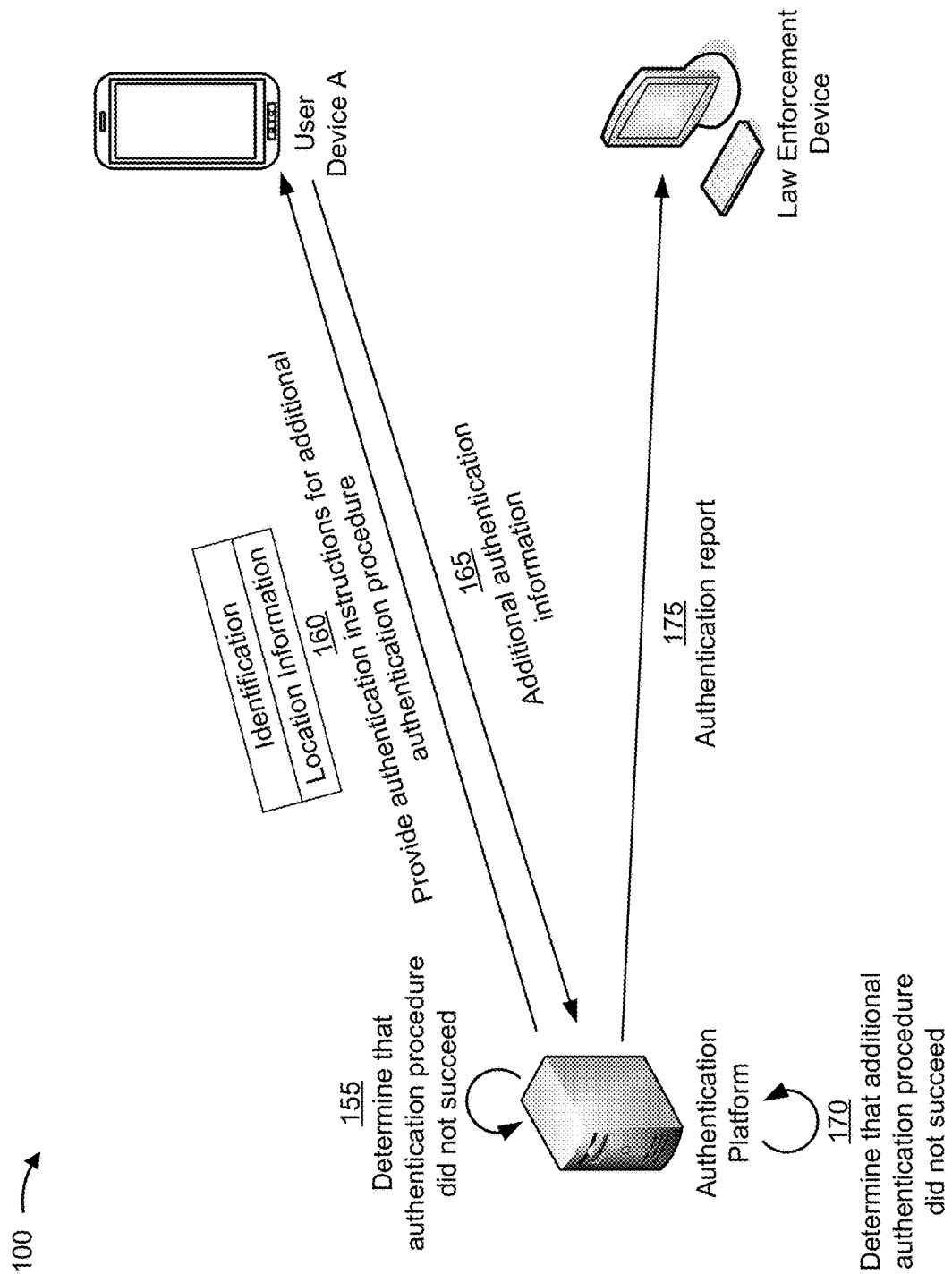

As shown in FIG. 1D, and by reference number 155, the authentication platform may determine that the authentication procedure did not succeed. For example, the authentication platform may receive, from the user device, an incorrect response to an authentication question, an incorrect authentication code, and/or the like, which may cause the user device to fail the authentication procedure.

In other cases, the authentication platform may determine that the user device has successfully completed the authentication procedure. In this case, the authentication platform may continue processing the request associated with the high-risk transaction (e.g., by granting the user device a new transaction card, by allowing an account balance transfer, etc.).

As shown by reference number 160, because the user device failed the authentication procedure, the authentication platform may provide the user device with authentication instructions for an additional authentication procedure. For example, the authentication platform may provide authentication instructions indicating that the user device is to submit a form of identification, consent to location tracking, perform a multi-modal authentication procedure, and/or the like, as each described above. As shown by reference number 165, the user device may attempt to satisfy the additional authentication procedure by providing additional authentication to the authentication platform.

As shown by reference number 170, the authentication platform may determine that the additional authentication platform did not succeed. As shown by reference number 175, the authentication platform may generate and provide an authentication report to a device associated with a law enforcement agency. The authentication report may include information indicating why the authentication procedure and the new authentication procedure did not succeed, information identifying the user device, information identifying a location of the user device, information identifying a user that attempted to complete the authentication procedure and/or the additional authentication procedure (e.g., a photograph, a fingerprint, a retinal scan, etc.), and/or the like. In this way, the authentication platform is able to notify law enforcement of transactions that are likely to be fraudulent.

In some implementations, after the authentication procedure has been completed, the authentication platform may retrain the data model to improve the accuracy of the risk score determinations. For example, a risk score may incorrectly indicate that the request is likely to be a fraudulent request and/or may incorrectly indicate that the request is unlikely to be a fraudulent request. In these cases, the authentication platform may modify one or more risk scores that are associated with particular features of the data model. For example, the authentication platform may modify a risk score such that a subsequent request associated with a high-risk transaction that is made under similar circumstances may be receive a risk score that more accurately reflects the risk of the request being a fraudulent request.

Additionally, or alternatively, the authentication platform may retrain the data model to include one or more new features that allow the data model to make more accurate risk score determinations. For example, the authentication platform may receive feedback information describing why a request was a fraudulent request or a legitimate request. As a particular example, an authorized user, or an employee of the organization that manages user accounts, may submit a response that includes details relating to why the request was a fraudulent request or a legitimate request. In this case, the authentication platform may process the feedback information to generate one or more new features that are able to be used to retrain the data model.

As an example, assume that the authentication platform incorrectly outputs a risk score indicating a high likelihood that a request for a new transaction card is a fraudulent request. Further assume the authentication platform selects an authentication procedure that requires more stringent authentication steps as a result of the risk score, and that an authorized user successfully completes the authentication procedure. Additionally, assume the authentication platform receives feedback information indicating that the authorized user had to update his or her address as part of an annual move (e.g., the user may have a job that requires regular relocation), and requested a new transaction card as a result of losing the original transaction card while moving to the new location. In this example, the authentication platform may generate a new feature that allows the data model to consider that the user changes locations annually, such that an update to the user's address during a subsequent move may generate a lower risk score. By generating new features that are contextualized to each user, the authentication platform is able to retrain the data model to more accurately reflect a risk of fraudulent use associated with the user account.

In this way, the authentication platform is able to prevent and/or deter fraudulent transactions without burdening authorized users with frivolous authentication procedures. Furthermore, by intelligently determining a risk score, the authentication platform is effectively able to determine a likelihood that the individual making the request associated with the high-risk transaction is an authorized user (or an unauthorized user). Additionally, by selectively identifying particular authentication procedures based on the risk score, the authentication platform is able to select authentication procedures that are able to explicitly identify the individual making the request (e.g., such as by requiring the user to provide an additional form of identification). This allows the organization (e.g., a bank) managing user requests and transactions to continue to optimize policies and/or processes that ultimately improve customer satisfaction, reduce fraud, reduce operational costs, and/or the like.

As indicated above, FIGS. 1A-1D are provided merely as an example. Other examples are possible and may differ from what was described with regard to FIGS. 1A-1D. For example, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) of example implementation 100 may perform one or more functions described as being performed by another set of devices of example implementation 100.

Figure 2A:
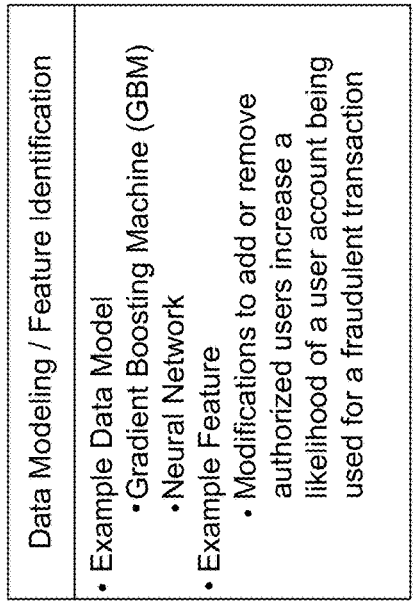
FIGS. 2A-2C are diagrams of an overview of another example implementation described herein.
Figure 2A:
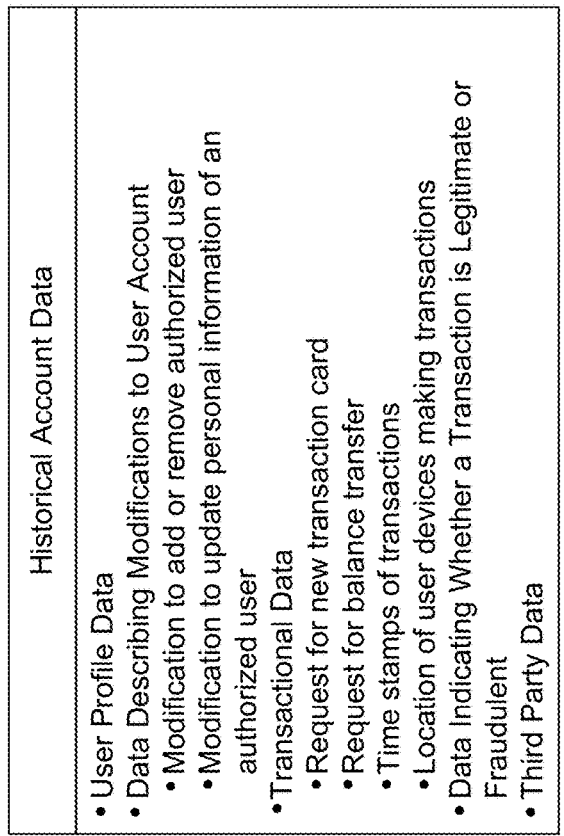
Figure 2A:
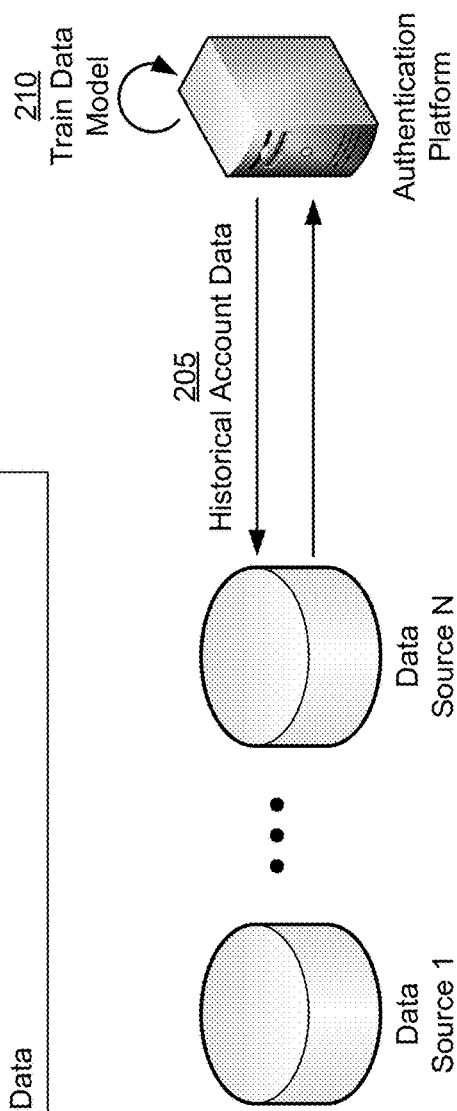
Figure 2B:
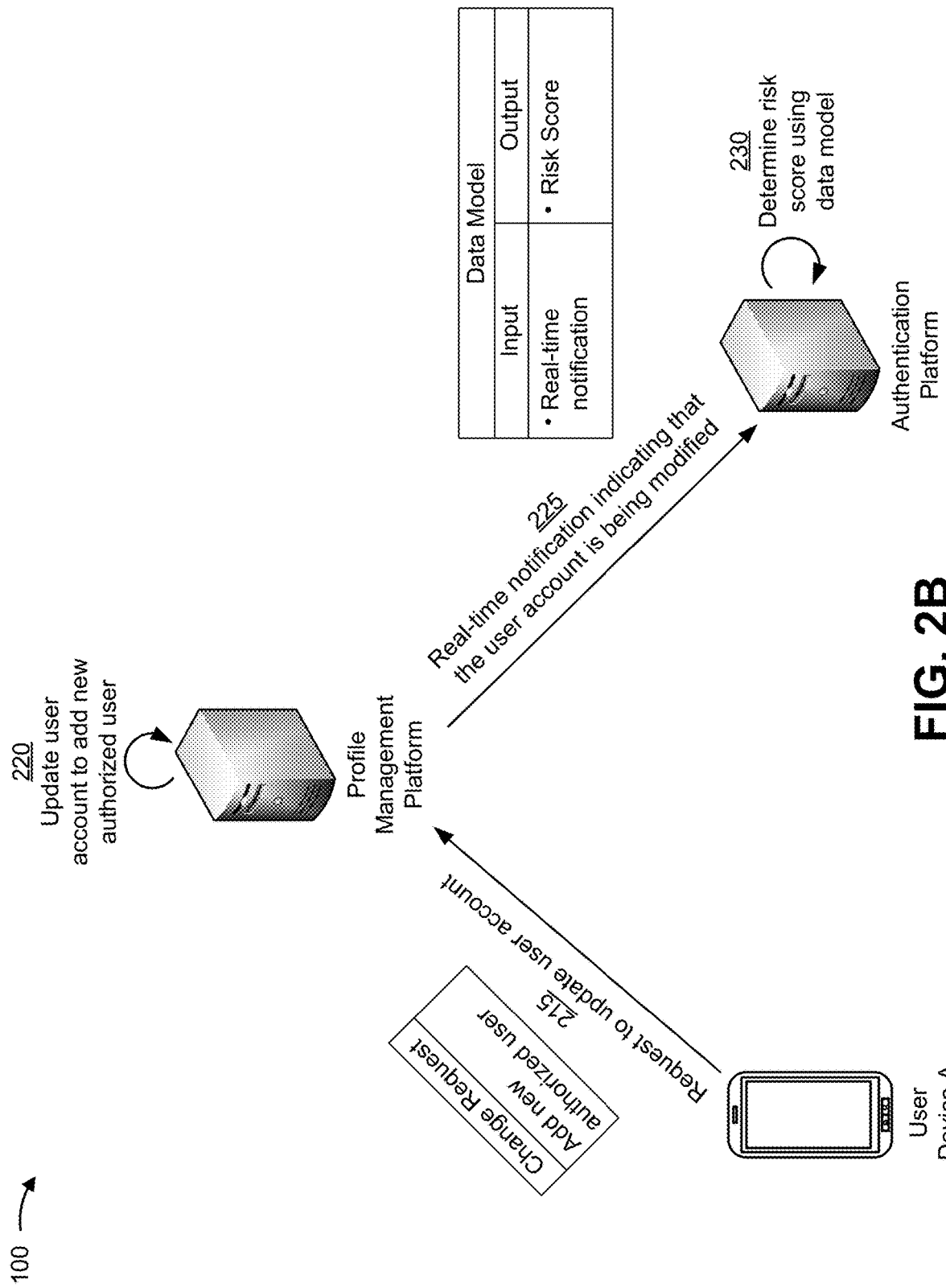
Figure 2C:
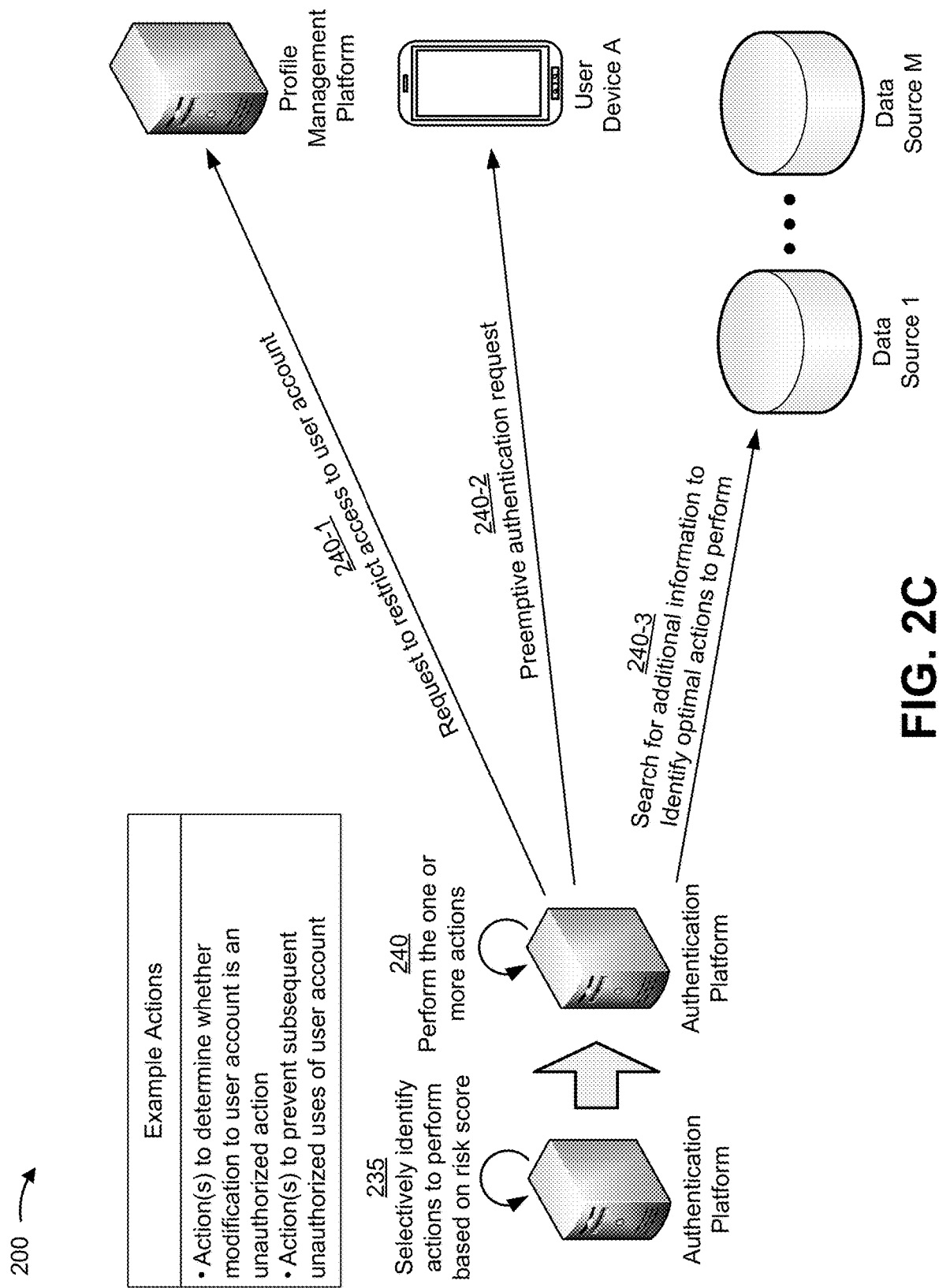

FIGS. 2A-2C are diagrams of an overview of an example implementation 200 described herein. For example, example implementation 200 may include an authentication platform to selectively identify and perform one or more actions based on a risk of fraudulent use associated with a user account. While FIGS. 1A-1D describe the authentication platform selectively identifying an authentication procedure after receiving a request associated with a high-risk transaction, in FIGS. 2A-2C, the authentication platform may perform preventative actions prior to receiving a request associated with a high-risk transaction.

As shown in FIG. 2A, and by reference number 205, the authentication platform may obtain historical account data associated with a group of user accounts, in a manner described above. As shown by reference number 210, the authentication platform may train a data model, in a manner described above. For example, the authentication platform may train a data model to generate risk scores that are able to predict a likelihood of interactions with user accounts being fraudulent interactions. In this case, the authentication platform may process the historical account data to identify features associated with fraudulent interactions with user accounts and/or features associated with legitimate interactions with user accounts. The features may be based on trends or reoccurring interactions with user accounts that are later found to be fraudulent or legitimate.

As an example, the authentication platform may identify a trend indicating that a modification to add a new authorized user is more likely to be a fraudulent modification if an existing authorized user is below a certain age. This trend may be based on the fact that a large portion of legitimately added authorized users are parents adding children that are old enough to own user accounts and/or spouses that are being added to user accounts after a marriage. As such, users below a certain age (e.g., ages 16 to 21) may be less likely to add an authorized user, which may, for user accounts with authorized users below the certain age, increase the likelihood of a modification requesting to add a new authorized user being a fraudulent modification.

In this way, the authentication platform is able to train a data model on the historical account data.

As shown in FIG. 2B, and by reference number 215, a user device (shown as User Device A) may provide a request to update a user account to a profile management platform. As shown as an example, the request may be a request to add a new authorized user. As shown by reference number 220, the profile management platform may update the user account to add the new authorized user.

As shown by reference number 225, the profile management platform may provide, to the authentication platform, a real-time notification indicating that the user account is being modified, in a manner described above. As shown by reference number 230, before receiving a real-time request associated with a high-risk transaction (as described in FIG. 1B), the authentication platform may use the data model to determine a risk score, in a manner described above.

In this way, the authentication platform is able to determine a risk score that may be used to selectively perform one or more actions associated with preventing fraud, as described further herein.

As shown in FIG. 2C, and by reference number 235, the authentication platform may selectively identify actions to perform based on the risk score. For example, the authentication platform may be configured with a set of ranges of risk scores, whereby each range of risk scores is associated with one or more actions that are to be performed. In this case, the authentication platform may identify a range of risk scores that the risk score falls between, and may select the one or more actions that are associated with range of risk scores. The one or more actions may include an action to determine whether a modification to a field of a user account is an unauthorized action, an action to prevent subsequent unauthorized use of the user account, and/or the like.

As shown by reference number 240, the authentication platform may perform the one or more actions. For example, as shown by reference number 240-1, the authentication platform may provide, to the profile management platform, a request to restrict access to the user account. In this case, the authentication platform may have determined a risk score indicating a high likelihood of the modification to the user account being a fraudulent modification. As such, the authentication platform may use an API to request to restrict access to the user account. In some cases, the authentication platform may have permission to automatically restrict access to the user account (e.g., without needing to request that the profile management platform enforce the restriction).

Additionally, or alternatively, and as shown by reference number 240-2, the authentication platform may preemptively provide authentication instructions for an authentication procedure to the user device (e.g., prior to the user device submitting a request associated with a high-risk transaction). For example, the authentication platform may selectively identify an authentication procedure in a manner described above, and may provide authentication instructions for the authentication procedure to the user device. In some cases, such as when the authentication instructions are provided in conjunction with restricting access to the user account, access to the user account may not be re-enabled until the authentication procedure is completed successfully.

Additionally, or alternatively, and as shown by reference number 240-3, the authentication platform may search one or more additional data sources (shown as Data Source 1 through Data Source M) for additional information that may be used to identify optimal actions to perform. For example, the authentication platform may search (e.g., query, mine, etc.) the one or more additional data sources for additional information that may increase or decrease a likelihood of the modification to the user account being a fraudulent modification. Additionally, the authentication platform may perform one or more additional actions based on whether the additional information increases or decreases the likelihood of the modification to the user account being a fraudulent modification (e.g., actions described in FIG. 1D, in FIG. 2C, etc.).

As an example, the authentication platform may search one or more social media accounts of authorized users to obtain recent social media posts, recent interactions with other users, recent changes to the one or more social media accounts, and/or the like. Additionally, the authentication platform may use a natural language processing technique to analyze the obtained information to determine whether the information increases or decreases a likelihood of the modification being a fraudulent modification. As a particular example, assume a user modifies a user account by updating an address. Further assume the user posts on social media to indicate that he or she is moving to a new location. In this case, the authentication platform may use the social media post as an indicator that reduces a likelihood of the modification to the user account being a fraudulent modification.

In this way, the authentication platform is able to perform one or more actions to prevent fraudulent uses associated with the user account. Furthermore, prevention of fraudulent uses associated with the user account conserves processing resources that might otherwise be used to provide reports of incidents of fraud to one or more devices, conserves network resources that might be used to provide alerts of incidents of fraud to one or more devices, conserves network resources that might be used to provide reimbursements and/or notifications of reimbursement to one or more devices, and/or the like.

Furthermore, by intelligently determining a risk score, the authentication platform is effectively able to determine a likelihood that the individual making the request associated with the high-risk transaction is an authorized user (or an unauthorized user). Additionally, by selectively identifying particular authentication procedures based on the risk score, the authentication platform is able to select authentication procedures that are able to explicitly identify the individual making the request (e.g., such as by requiring the user to provide an additional form of identification). This allows the organization (e.g., a bank) managing user requests and transactions to continue to optimize policies and/or processes that ultimately improve customer satisfaction, reduce fraud, reduce operational costs, and/or the like.

As indicated above, FIGS. 2A-2C are provided merely as an example. Other examples are possible and may differ from what was described with regard to FIGS. 2A-2C. For example, there may be additional devices and/or networks, fewer devices and/or networks, different devices and/or networks, or differently arranged devices and/or networks than those shown in FIGS. 2A-2C. Furthermore, two or more devices shown in FIGS. 2A-2C may be implemented within a single device, or a single device shown in FIGS. 2A-2C may be implemented as multiple, distributed devices. Additionally, or alternatively, a set of devices (e.g., one or more devices) of example implementation 200 may perform one or more functions described as being performed by another set of devices of example implementation 200.

Figure 3:
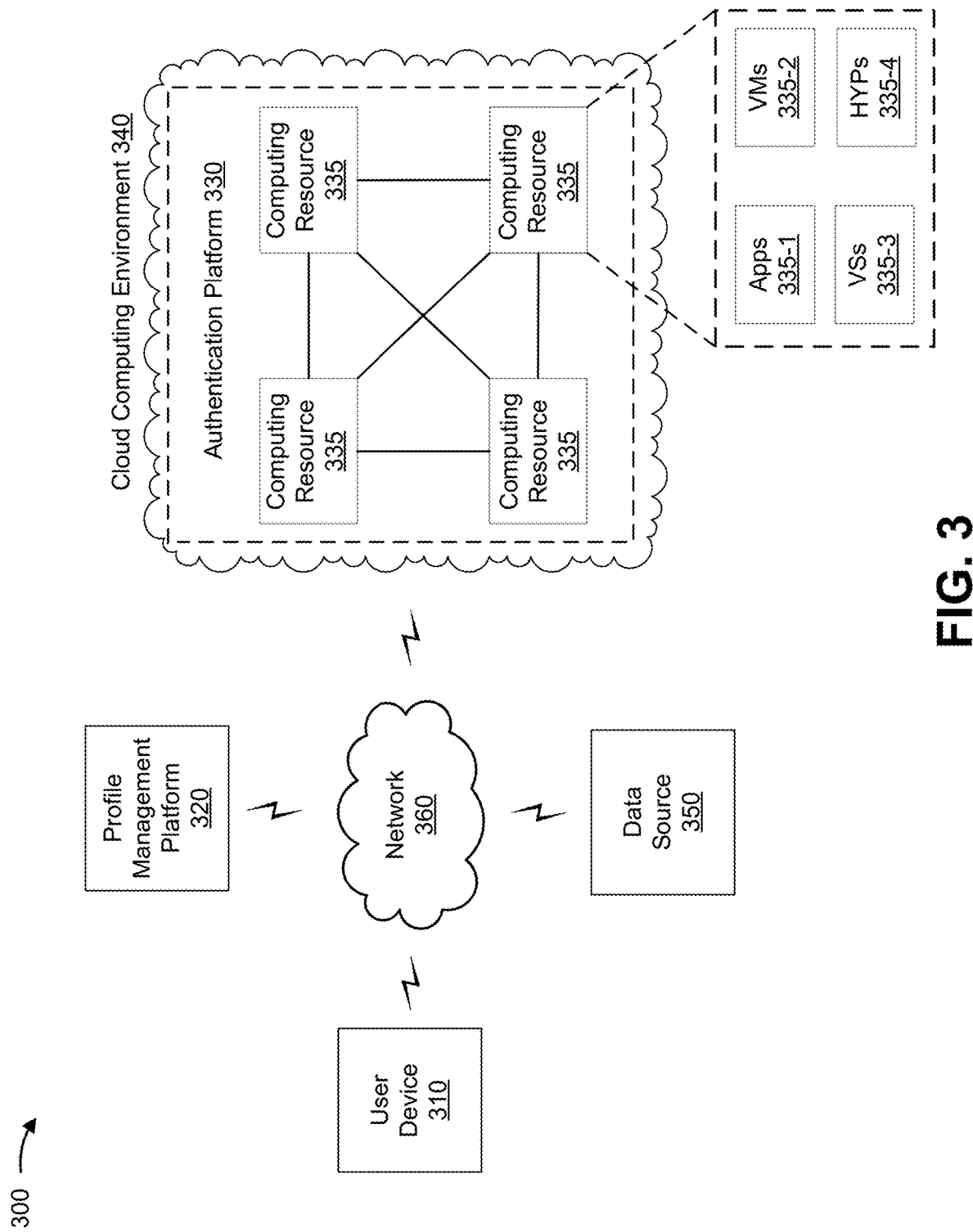
FIG. 3 is a diagram of an example environment in which systems and/or methods, described herein, may be implemented.

FIG. 3 is a diagram of an example environment 300 in which systems and/or methods, described herein, may be implemented. As shown in FIG. 3, environment 300 may include user device 310, profile management platform 320, authentication platform 330 hosted within cloud computing environment 340, data source 350, and/or network 360. Devices of environment 300 may interconnect via wired connections, wireless connections, or a combination of wired and wireless connections.

User device 310 includes one or more devices capable of receiving, storing, generating, processing, and/or providing information associated with a user account. For example, user device 310 may include a communication and/or computing device, such as a phone (e.g., a mobile phone, such as a smartphone, a radiotelephone, etc.), a laptop computer, a tablet computer, a handheld computer, a gaming device, a wearable communication device (e.g., a smart wristwatch, a pair of smart eyeglasses, etc.), or a similar type of device.

In some implementations, user device 310 may provide a request to modify a user account to profile management platform 320. In some implementations, user device 310 may provide a request associated with a high-risk transaction to authentication platform 330. In some implementations, user device 310 may receive authentication instructions for an authentication procedure from authentication platform 330, and may provide authentication information associated with the authentication procedure to authentication platform 330.

Profile management platform 320 includes one or more devices capable of receiving, storing, generating, processing, and/or providing information associated with a user account. For example, profile management platform 320 may include a server device or a group of server devices. In some implementations, profile management platform 320 may provide a real-time notification indicating that a user account is being modified to authentication platform 330. In some implementations, profile management platform 320 may receive a request to restrict access to a user account or instructions to restrict access to the user account from authentication platform 330.

Authentication platform 330 includes one or more devices capable of receiving, storing, generating, processing, and/or providing information associated with a user account. For example, authentication platform 330 may include a server device (e.g., a host server, a web server, an application server, etc.), a data center device, or a similar device. In some implementations, authentication platform 330 may provide a request for historical account data to data source 350.

In some implementations, as shown, authentication platform 330 may be hosted in cloud computing environment 340. Notably, while implementations described herein describe authentication platform 330 as being hosted in cloud computing environment 340, in some implementations, authentication platform 330 might not be cloud-based (i.e., may be implemented outside of a cloud computing environment) or might be partially cloud-based.

Cloud computing environment 340 includes an environment that hosts authentication platform 330. Cloud computing environment 340 may provide computation, software, data access, storage, and/or other services that do not require end-user knowledge of a physical location and configuration of system(s) and/or device(s) that host authentication platform 330. As shown, cloud computing environment 340 may include a group of computing resource 335 (referred to collectively as "computing resources 335 and individually as "computing resource 335").

Computing resource 335 includes one or more personal computers, workstation computers, server devices, or another type of computation and/or communication device. In some implementations, computing resource 335 may host authentication platform 330. The cloud resources may include compute instances executing in computing resource 335, storage devices provided in computing resource 335, data transfer devices provided by computing resource 335, etc. In some implementations, computing resource 335 may communicate with other computing resources 335 via wired connections, wireless connections, or a combination of wired and wireless connections.

As further shown in FIG. 3, computing resource 335 may include a group of cloud resources, such as one or more applications ("APPs") 335-1, one or more virtual machines ("VMs") 335-2, virtualized storage ("VSs") 335-3, one or more hypervisors ("HYPs") 335-4, or the like.

Application 335-1 includes one or more software applications that may be provided to or accessed by user device 310. Application 335-1 may eliminate a need to install and execute the software applications on user device 310. For example, application 335-1 may include software associated with authentication platform 330 and/or any other software capable of being provided via cloud computing environment 340. In some implementations, one application 335-1 may send/receive information to/from one or more other applications 335-1, via virtual machine 335-2.

Virtual machine 335-2 includes a software implementation of a machine (e.g., a computer) that executes programs like a physical machine. Virtual machine 335-2 may be either a system virtual machine or a process virtual machine, depending upon use and degree of correspondence to any real machine by virtual machine 335-2. A system virtual machine may provide a complete system platform that supports execution of a complete operating system ("OS"). A process virtual machine may execute a single program, and may support a single process. In some implementations, virtual machine 335-2 may execute on behalf of a user (e.g., user device 310), and may manage infrastructure of cloud computing environment 340, such as data management, synchronization, or long-duration data transfers.

Virtualized storage 335-3 includes one or more storage systems and/or one or more devices that use virtualization techniques within the storage systems or devices of computing resource 335. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 335-4 provides hardware virtualization techniques that allow multiple operating systems (e.g., "guest operating systems") to execute concurrently on a host computer, such as computing resource 335. Hypervisor 335-4 may present a virtual operating platform to the guest operating systems, and may manage the execution of the guest operating systems. Multiple instances of a variety of operating systems may share virtualized hardware resources.

Data source 350 includes one or more devices capable of receiving, storing, generating, processing, and/or providing information associated with a user account. For example, data source 350 may include a server device or a group of server devices. In some implementations, data source 350 may store historical account data, and may provide the historical account data to authentication platform 330, as described elsewhere herein.

Network 360 includes one or more wired and/or wireless networks. For example, network 360 may include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

FIG. 4 is a diagram of example components of a device 400. Device 400 may correspond to user device 310, profile management platform 320, authentication platform 330, and/or data source 350. In some implementations, user device 310, profile management platform 320, authentication platform 330, and/or data source 350 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flow chart of an example process 500 for determining a risk score that identifies a likelihood of fraudulent use associated with a user account, and selectively identifying and providing a user device with an authentication procedure that is based on the risk score. In some implementations, one or more process blocks of FIG. 5 may be performed by authentication platform 330. In some implementations, one or more process blocks of FIG. 5 may be performed by another device or a group of devices separate from or including authentication platform 330, such as user device 310, profile management platform 320, and/or data source 350.

As shown in FIG. 5, process 500 may include receiving, from a server device, a real-time notification indicating that one or more fields of a user account are being modified (block 510). For example, an authentication platform (e.g., authentication platform 330, using computing resource 335, processor 420, input component 450, etc.) may receive, from a server device (e.g., profile management platform 320), a real-time notification indicating that one or more fields of a user account are being modified, as described, for example, in connection with FIGS. 1A-1D above.

As shown in FIG. 5, process 500 may include receiving a request associated with a high-risk transaction involving the user account (block 520). For example, the authentication platform (e.g., authentication platform 330, using computing resource 335, processor 420, input component 450, etc.) may receive, from a user device (e.g., user device 310), a request associated with a high-risk transaction involving the user account, as described, for example, in connection with FIGS. 1A-1D above.

As shown in FIG. 5, process 500 may include determining a risk score indicating a likelihood of the high-risk transaction being performed by an unauthorized user (block 530). For example, the authentication platform (e.g., authentication platform 330, using computing resource 335, processor 420, etc.) may determine a risk score indicating a likelihood of the high-risk transaction being performed by an unauthorized user, as described, for example, in connection with FIGS. 1A-1D above.

As shown in FIG. 5, process 500 may include selectively identifying an authentication procedure, of a group of authentication procedures, based on the risk score (block 540). For example, the authentication platform (e.g., authentication platform 330, using computing resource 335, processor 420, etc.) may selectively identify an authentication procedure, of a group of authentication procedures, after determining the risk score, as described, for example, in connection with FIGS. 1A-1D above.

As shown in FIG. 5, process 500 may include providing authentication instructions for the authentication procedure to the user device to the user device to allow the user device to perform the authentication procedure (block 550). For example, the authentication platform (e.g., authentication platform 330, using computing resource 335, processor 420, output component 460, etc.) may provide authentication instructions for the authentication procedure to the user device (e.g., user device 310) to allow the user device to perform the authentication procedure, as described, for example, in connection with FIGS. 1A-1D above.

Process 500 may include additional implementations, such as any single implementation or any combination of implementations described below.

In some implementations, the authentication platform may determine the risk score by providing, as input to the data model, information associated with the real-time notification and information associated with the request to cause the data model to output the risk score. In some cases, the information associated with the real-time notification may have a first time stamp, the information associated with the request may have a second time stamp, and a time period between the first time stamp and the second time stamp may be a factor that the data model considers in determining the risk score.

In some implementations, the authentication platform may selectively identify the authentication procedure. For example, the authentication platform may determine whether the risk score falls within a first range of risk scores or a second range of risk scores. Additionally, the authentication platform may identify a first authentication or a second authentication procedure, as the authentication procedure, based on whether the risk score falls within the first range of risk scores or the second range of risk scores. The first authentication procedure may be able to verify whether the user is an authorized user by providing the user device with a request for an authentication code. The authentication code may be provided to an authorized user device or an authorized electronic mailing address. The second authentication procedure may be able to verify whether the user is the authorized user by providing the user device with questions relating to the user or the user account.

In some implementations, the authentication procedure may be a first authentication procedure that is able to verify that the user is an authorized user by providing the user device with a request for an authentication code. The authentication code may be provided to an authorized user device or an authorized electronic mailing address. In some implementations, the authentication procedure may be a second authentication procedure that is able to verify that the user is the authorized user by providing the user device with questions relating to the user or the user account. In some implementations, the authentication procedure may be a third authentication procedure that is able to verify that the user is the authorized user by requesting a biometric identification of the user.

In some implementations, the authentication platform may receive an indication that the user device did not successfully complete the authentication procedure. Additionally, the authentication platform may select a new authentication procedure, of a group of authentication procedures, based on receiving the indication that the user device did not successfully perform the authentication procedure. The new authentication procedure may be able to determine whether the user is an authorized user by requesting a biometric identification of the user.

Additionally, the authentication platform may provide authentication instructions for the new authentication procedure to the user device to allow the user device to perform the new authentication procedure. Additionally, the authentication platform may receive an indication that the user device did not successfully complete the new authentication procedure. Additionally, the authentication platform may provide, to a device associated with a law enforcement agency, an authentication report describing information associated with the authentication procedure and the new authentication procedure. The authentication report may include information indicating why the authentication procedure and the new authentication procedure did not succeed, information identifying the user device, information identifying a location of the user device, and/or the like.

In some implementations, the authentication platform may receive data indicating whether the request associated with the high-risk transaction was an authorized request or an unauthorized request. Additionally, the authentication platform may determine that the risk score was not an accurate indicator of a likelihood of the request being unauthorized. Additionally, the authentication platform may determine one or more features to use for retraining the data model by processing additional information associated with the user or the user account. The one or more features are able to be used as indicators of authorized or unauthorized requests. Additionally, the authentication platform may retrain the data model using the one or more features to allow the data model to make more accurate risk score determinations.

In some implementations, the authentication platform may determine a set of risk scores before receiving a request associated with a high-risk transaction involving the user account. For example, the authentication platform may determine a set of risk scores associated with the modification of the one or more fields of the user account. The set of risk scores may be determined using a data model that has been trained on historical account data associated with a group of user accounts. The set of risk scores may indicate a likelihood of the one or more fields being modified as part of an unauthorized use of the user account.

Additionally, the authentication platform may receive a request associated with a high-risk transaction involving the user account. Additionally, the authentication platform may selectively identify an authentication procedure, of a group of authentication procedures, after receiving the request. The authentication procedure may be identified based on risk score, of the set of risk scores, that is associated with an amount of time between receipt of the real-time notification and receipt of the request associated with the high-risk transaction. Additionally, the authentication platform may provide authentication instructions for the authentication procedure to the user device to allow the authentication procedure to be completed.

In some implementations, the authentication platform may determine the set of risk scores by providing information associated with the real-time notification as input to the data model to cause the data model to output the set of risk scores. A factor that the data model may use to output the risk score, of the set of risk scores, may be a particular time period between the receipt of the real-time notification and an estimated time of receipt of the request associated with the high-risk transaction.

In some implementations, the authentication platform may selectively identify the authentication procedure based on the risk score. The authentication procedure may be a first authentication procedure, of the group of authentication procedures, if the risk score satisfies a threshold amount of risk, or a second authentication procedure, of the group of authentication procedures, if the risk score does not satisfy the threshold amount of risk. The first authentication procedure may be able to verify whether the user is an authorized user by providing the user device with a request for an authentication code that is as part of the authentication instructions. The second authentication procedure may be able to verify whether the user is the authorized user by providing the user device with questions relating to the user or the user account.

In some implementations, the group of authentication procedures may include a first authentication procedure that is able to verify whether the user is an authorized user by providing the user device with a request for an authentication code, a second authentication procedure that is able to verify whether the user is the authorized user by providing the user device with questions relating to the user or the user account, a third authentication procedure that is able to verify that the user is the authorized user by requesting a biometric identification of the user, a fourth authentication procedure that requires that authentication information be provided via a plurality of communication mediums, and/or the like.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for determining a risk score that identifies a likelihood of fraudulent use associated with a user account, and, based on the risk score, selectively identifies and performs actions associated with prevention of fraudulent use of the user account. In some implementations, one or more process blocks of FIG. 6 may be performed by authentication platform 330. In some implementations, one or more process blocks of FIG. 6 may be performed by another device or a group of devices separate from or including authentication platform 330, such as user device 310, profile management platform 320, and/or data source 350.

As shown in FIG. 6, process 600 may include receiving a data model that has been trained on historical account data associated with a group of user accounts (block 610). For example, an authentication platform (e.g., authentication platform 330, using computing resource 335, processor 420, input component 450, etc.) may receive, from another device, a data model that has been trained on historical account data associated with a group of user accounts, as described, for example, in connection with FIGS. 2A-2C above.

As shown in FIG. 6, process 600 may include receiving, from a server device, a real-time notification indicating that one or more fields of a user account are being modified (block 620). For example, the authentication platform (e.g., authentication platform 330, using computing resource 335, processor 420, input component 450, etc.) may receive, from a server device (e.g., profile management platform 320), a real-time notification indicating that one or more fields of a user account are being modified, as described, for example, in connection with FIGS. 2A-2C above.

As shown in FIG. 6, process 600 may include determining, using the data model, a risk score associated with modifications to the one or more fields (block 630). For example, the authentication platform (e.g., authentication platform 330, using computing resource 335, processor 420, etc.) may determine, using the data model, a risk score associated with modifications to the one or more fields, as described, for example, in connection with FIGS. 2A-2C above.

As shown in FIG. 6, process 600 may include selectively identifying one or more actions to perform based on the risk score (block 640). For example, the authentication platform (e.g., authentication platform 330, using computing resource 335, processor 420, etc.) may selectively identify one or more actions to perform based on the risk score, as described, for example, in connection with FIGS. 2A-2C above.

As shown in FIG. 6, process 600 may include performing the one or more actions that have been selectively identified (block 650). For example, the authentication platform (e.g., authentication platform 330, using computing resource 335, processor 420, etc.) may perform the one or more actions that have been selectively identified, as described, for example, in connection with FIGS. 2A-2C above.

Process 600 may include additional implementations, such as any single implementation or any combination of implementations described below.

In some implementations, the authentication platform may receive, from a user device, a request associated with a high-risk transaction involving the user account. Additionally, the authentication platform may determine, using the data model, a new risk score indicating a likelihood of the request being an unauthorized request. Additionally, the authentication platform may select an authentication procedure, of a group of authentication procedures, based on the new risk score. Additionally, the authentication platform may provide authentication instructions for the authentication procedure to the user device to allow the authentication procedure to be completed.

In some implementations, the one or more actions may include a first group of one or more actions to determine whether the modification of the one or more fields is an unauthorized action and/or a second group of one or more actions to prevent subsequent unauthorized access to the user account. In some implementations, the one or more actions may include a first action to provide authentication instructions for an authentication procedure a user device that was used to modify the one or more fields of the user account, a second action to obtain additional information from a data source, a third action to restrict access to the user account, and/or the like.

In some implementations, the authentication platform may selectively identify, as a first action of the one or more actions, an action to restrict access to the user account. Additionally, the authentication platform may restrict the access to the user account to prevent the user device from continuing to access the user account. Additionally, or alternatively, the authentication platform may selectively identify, as a second action of the one or more actions, an action to provide authentication instructions for an authentication procedure to a user device that was used to modify the one or more fields of the user account. Additionally, the authentication platform may provide the authentication instructions for the authentication procedure to the user device to allow the authentication procedure to be completed. In some cases, the authentication platform may determine whether to restrict access to the user account based on whether the authentication procedure succeeds or fails.

In some implementations, the authentication platform may selectively identify, as a first action of the one or more actions, an action to restrict access to the user account. Additionally, the authentication platform may restrict the access to the user account to prevent the user device from continuing to access the user account. In some implementations, the authentication platform may selectively identify, as a second action of the one or more actions, an action to provide authentication instructions for a multi-modal authentication procedure to a user device that was used to modify the one or more fields of the user account. Additionally, the authentication platform may provide the authentication instructions for the multi-modal authentication procedure to the user device to allow the multi-modal authentication procedure to be completed. In some cases, the multi-modal authentication procedure may be used as a first action.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

By intelligently selecting an authentication procedure that is based on a risk of fraudulent use of the user account, the authentication platform is able to prevent and/or deter fraudulent transactions without burdening authorized users with unnecessary authentication procedures. Furthermore, the authentication platform reduces a utilization of processing resources and/or network resources relative an inferior platform that uses the same authentication procedure for all requests associated with high-risk transactions. For example, if the authentication platform determines that the risk of fraud is low, the authentication platform may select an authentication procedure that less processing intensive than would otherwise be selected by the inferior platform.

Additionally, by deterring fraudulent transactions associated with the user account, the authentication platform conserves processing resources that might otherwise be used to generate reports of incidents of fraud, conserves processing resources that might be used to generate alerts of incidents of fraud, conserves processing resources that might be used to generate reimbursements and/or notifications of reimbursement for customer devices after incidents of fraud, and/or the like.

Additionally, the authentication platform conserves network resources that might otherwise be used to provide reports of incidents of fraud to one or more devices, conserves network resources that might be used to provide alerts of incidents of fraud to one or more devices, conserves network resources that might be used to provide reimbursements and/or notifications of reimbursement to one or more devices, and/or the like. Furthermore, the authentication platform conserves memory resources that might be used to store reports of incidents of fraud, conserves memory resources that might be used to store alerts of incidents of fraud, conserves memory resources that might be used to store reimbursement information and/or notifications of reimbursements associated with fraud, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A non-transitory computer-readable medium storing instructions, the instructions comprising:
 one or more instructions that, when executed by one or more processors, cause the one or more processors to:
  receive, from a server device, a real-time notification indicating that one or more fields of a user account are being modified,
   wherein the one or more fields that are being modified include:
    data describing personal information of a user associated with the user account, or
    data identifying one or more authorized users of the user account;
  receive, from a user device, a request associated with a high-risk transaction involving the user account;
  request, from a data source, additional information associated with the user;
  determine a risk score indicating a likelihood of the high-risk transaction being performed by an unauthorized user,
   wherein the risk score is determined using a data model that has been trained on historical account data associated with a group of user accounts, that include the user account,
    wherein the data model is trained to associate a set of risk scores, including the risk score, with a set of time ranges indicating a set of estimated time periods at which the high-risk transaction may be performed, and
   wherein the one or more instructions, that cause the one or more processors to determine the risk score, cause the one or more processors to:
    provide, as input to the data model, information associated with the real-time notification and information associated with the request associated with the high-risk transaction to cause the data model to output the risk score,
     wherein the information associated with the real-time notification has a first time stamp,
     wherein the information associated with the request associated with the high-risk transaction has a second time stamp, and
     wherein the data model is trained to compare a time period, between the first time stamp and the second time stamp, and the set of time ranges to identify a particular time range within which the time period falls,
      the set of time ranges indicating the set of estimated time periods at which the high-risk transaction may be performed, and
      the risk score being associated with the particular time range;
  increase or decrease the risk score based on the additional information associated with the user;
  selectively identify an authentication procedure, of a group of authentication procedures, after increasing or decreasing the risk score,
   wherein the group of authentication procedures are associated with ranges of risk scores, and
   wherein the authentication procedure is identified based on the risk score falling within a particular range of risk scores of the ranges of risk scores;
  provide authentication instructions for the authentication procedure to the user device to allow the user device to perform the authentication procedure;
  receive authentication information from the user device; and
  determine, based on the authentication information, whether the authentication procedure succeeded.

2. The non-transitory computer-readable medium of claim 1, wherein the one or more instructions, that cause the one or more processors to selectively identify the authentication procedure, cause the one or more processors to:
 determine whether the risk score falls within a first range of risk scores, of the ranges of risk scores, or a second range of risk scores, of the ranges of risk scores, and
 identify a first authentication procedure or a second authentication procedure, as the authentication procedure, based on determining whether the risk score falls within the first range of risk scores or the second range of risk scores,
  wherein the first authentication procedure is able to verify whether the user is an authorized user by providing the user device with a request for an authentication code,
   wherein the authentication code is to be provided to an authorized user device or an authorized electronic mailing address, and
  wherein the second authentication procedure is able to verify whether the user is the authorized user by providing the user device with authentication questions relating to the user or the user account.

3. The non-transitory computer-readable medium of claim 1, wherein the authentication procedure is:
 a first authentication procedure that is able to verify that the user is an authorized user by providing the user device with a request for an authentication code,
  wherein the authentication code is to be provided to an authorized user device or an authorized electronic mailing address,
 a second authentication procedure that is able to verify that the user is the authorized user by providing the user device with authentication questions relating to the user or the user account, or
 a third authentication procedure that is able to verify that the user is the authorized user by requesting a biometric identification of the user.

4. The non-transitory computer-readable medium of claim 1, wherein the one or more instructions, when executed by the one or more processors, further cause the one or more processors to:
 receive an indication that the user device did not successfully complete the authentication procedure;
 select a new authentication procedure, of the group of authentication procedures, based on receiving the indication that the user device did not successfully perform the authentication procedure,
  wherein the new authentication procedure is able to determine whether the user is an authorized user by requesting a biometric identification of the user;
 provide new authentication instructions for the new authentication procedure to the user device to allow the user device to perform the new authentication procedure;

receive an indication that the user device did not successfully complete the new authentication procedure; and provide, to a device associated with a law enforcement agency, an authentication report describing information associated with the authentication procedure and the new authentication procedure, wherein the authentication report includes at least one of:

information indicating why the authentication procedure and the new authentication procedure did not succeed, information identifying the user device, or information identifying a location of the user device.

5. The non-transitory computer-readable medium of claim 1, wherein the one or more instructions, when executed by the one or more processors, further cause the one or more processors to:

receive data indicating whether the request associated with the high-risk transaction was an authorized request or an unauthorized request;

determine that the risk score was not an accurate indicator of a likelihood of the request associated with the high-risk transaction being unauthorized;

determine one or more features to use for retraining the data model by processing additional information associated with the user or the user account, wherein the one or more features are able to be used as indicators of authorized or unauthorized requests; and retrain the data model using the one or more features to allow the data model to make more accurate risk score determinations.

6. A device, comprising:

one or more memories; and one or more processors, communicatively coupled to the one or more memories, to:

receive a data model that has been trained on historical account data associated with a group of user accounts, wherein the historical account data includes data associated with fraudulent transactions and data associated with legitimate transactions;

receive, from a server device, a real-time notification indicating that one or more fields of a user account, of the group of user accounts, are being modified, wherein the one or more fields that are being modified include at least one of:

data describing personal information of a user associated with the user account, or data identifying one or more authorized users of the user account;

receive a request associated with a high-risk transaction involving the user account;

determine, using the data model, a risk score associated with modifications to the one or more fields, wherein the risk score indicates a likelihood of the one or more fields being modified as part of an unauthorized use of the user account, wherein the data model is trained to associate a set of risk scores, including the risk score, with a set of time ranges indicating a set of estimated time periods at which the high-risk transaction may be performed, and wherein the one or more processors, when determining the risk score, are to:

provide, as input to the data model, information associated with the real-time notification to cause the data model to output the risk score, wherein the information associated with the real-time notification has a first time stamp, wherein the information associated with the request associated with the high-risk transaction has a second time stamp, and wherein the data model is trained to compare a time period, between the first time stamp and the second time stamp, and the set of time ranges to identify a particular time range within which the time period falls, the set of time ranges indicating the set of estimated time periods at which the high-risk transaction may be performed, and the risk score being associated with the particular time range;

request, from a data source, additional information associated with the user;

increase or decrease the risk score based on the additional information associated with the user;

selectively identify, after increasing or decreasing the risk score, an authentication procedure, of a group of authentication procedures, wherein the group of authentication procedures are associated with ranges of risk scores, and wherein the authentication procedure is identified based on the risk score falling within a particular range of risk scores of the ranges of risk scores;

provide authentication instructions for the authentication procedure to a user device associated with the user account to allow the user device to perform the authentication procedure;

receive authentication information from the user device; and determine, based on the authentication information, whether the authentication procedure succeeded.

7. The device of claim 6, wherein the one or more processors are further to:

receive a new request associated with a new high-risk transaction involving the user account;

determine, using the data model, a new risk score indicating a likelihood of the new request being an unauthorized request;

select another authentication procedure, of the group of authentication procedures, based on the new risk score; and provide other authentication instructions for the other authentication procedure to the user device to allow the other authentication procedure to be completed.

8. The device of claim 6, wherein the one or more processors are further to:

perform one or more actions that include at least one of:

a first action to determine, based on the additional information, whether the risk score is accurately identifying the likelihood of the one or more fields being modified as part of an unauthorized use of the user account, or a second action to restrict access to the user account or to request to restrict access to the user account.

9. The device of claim 6, wherein the one or more processors are further to:

restrict, based on the risk score, access to the user account to prevent the user device from continuing to access the user account until determining that the authentication procedure succeeded.

10. The device of claim 6, wherein the one or more processors are further to:
 determine whether to restrict access to the user account based on whether the authentication procedure succeeds or fails.

11. The device of claim 6, wherein the authentication procedure comprises a multi-modal authentication procedure.

12. A method, comprising:
 receiving, by a device and from a server device, a real-time notification indicating that one or more fields of a user account are being modified,
  wherein the one or more fields that are being modified include:
   data describing personal information of a user associated with the user account, or
   data identifying one or more authorized users of the user account;
 receiving, by the device and from a user device, a request associated with a high-risk transaction involving the user account;
 determining, by the device, a set of risk scores associated with a modification of the one or more fields of the user account,
  wherein the set of risk scores are determined using a data model that has been trained on historical account data associated with a group of user accounts, that include the user account,
  wherein the set of risk scores indicate a likelihood of the one or more fields being modified as part of an unauthorized use of the user account,
  wherein the data model is trained to associate a set of risk scores, including the risk score, with a set of time ranges indicating a set of estimated time periods at which the high-risk transaction may be performed, and
  wherein determining the set of risk scores comprises:
   providing, as input to the data model, information associated with the real-time notification to cause the data model to output the set of risk scores,
    wherein the information associated with the real-time notification has a first time stamp,
    wherein the information associated with the request associated with the high-risk transaction has a second time stamp, and
    wherein the data model is trained to compare a time period, between the first time stamp and the second time stamp, and the set of time ranges to identify a particular time range within which the time period falls,
     the set of time ranges indicating the set of estimated time periods at which the high-risk transaction may be performed, and
     at least one risk score, of the set of risk scores, being associated with the particular time range;
 request, from a data source, additional information associated with the user;
 increase or decrease a risk score, of the set of risk scores, based on the additional information associated with the user;
 selectively identifying, by the device, an authentication procedure, of a group of authentication procedures, after receiving the request associated with the high-risk transaction,
  wherein the authentication procedure is identified based on the risk score;
 providing, by the device, authentication instructions for the authentication procedure to the user device to allow the authentication procedure to be completed;
 receiving, by the device and based on providing the authentication instructions, authentication information from the user device; and
 determining, by the device and based on the authentication information, whether the authentication procedure succeeded.

13. The method of claim 12, wherein selectively identifying the authentication procedure comprises:
 selectively identifying the authentication procedure based on the risk score,
  wherein the authentication procedure is a first authentication procedure, of the group of authentication procedures, if the risk score satisfies a threshold amount of risk, or a second authentication procedure, of the group of authentication procedures, if the risk score does not satisfy the threshold amount of risk,
  wherein the first authentication procedure is able to verify whether the user is an authorized user by providing the user device with a request for an authentication code that is as part of the authentication instructions, and
  wherein the second authentication procedure is able to verify whether the user is the authorized user by providing the user device with authentication questions relating to the user or the user account.

14. The method of claim 12, wherein the group of authentication procedures include at least one of:
 a first authentication procedure that is able to verify whether the user is an authorized user by providing the user device with a request for an authentication code,
 a second authentication procedure that is able to verify whether the user is the authorized user by providing the user device with authentication questions relating to the user or the user account, or
 a third authentication procedure that is able to verify that the user is the authorized user by requesting a biometric identification of the user.

15. The method of claim 12, wherein selectively identifying the authentication procedure comprises:
 selectively identifying the authentication procedure based on the risk score,
  wherein the authentication procedure is a multi-modal authentication procedure that requires that the authentication information be provided via a plurality of communication mediums.

16. The method of claim 12, further comprising:
 receiving an indication that the user device did not successfully perform the authentication procedure;
 selectively identifying a new authentication procedure, of the group of authentication procedures, based on receiving the indication that the user device did not successfully complete the authentication,
  wherein the new authentication procedure is able to verify that the user is an authorized user by requesting a biometric identification of the user; and
 providing new authentication instructions for the new authentication procedure to the user device to allow the user device to perform the new authentication procedure.

17. The method of claim 12, further comprising:
 receiving data indicating whether the modification of the one or more fields of the user account was authorized or unauthorized;

receiving data indicating whether the request associated with the high-risk transaction was authorized or unauthorized;

determining that the authentication procedure was not a best-available authentication procedure, of the group of authentication procedures, based on the data indicating whether the modification of the one or more fields of the user account was authorized or unauthorized and based on the data indicating whether the request associated with the high-risk transaction was authorized or unauthorized;

determining one or more features to use for retraining the data model by processing additional information associated with the user or the user account,
  wherein the one or more features are able to be used as indicators of authorized or unauthorized actions; and retraining the data model using the one or more features to allow the data model to make more accurate risk score determinations.

18. The method of claim 12, further comprising:

receiving, from the user device, a second request associated with a second high-risk transaction involving the user account;

determining, using the data model, a second risk score indicating a likelihood of the second request being an unauthorized request;

selecting a second authentication procedure, of the group of authentication procedures, based on the second risk score; and providing second authentication instructions for the second authentication procedure to the user device to allow the second authentication procedure to be completed.

19. The non-transitory computer-readable medium of claim 1, wherein the authentication procedure includes a multi-modal authentication procedure; and
  the authentication instructions enable the multi-modal authentication procedure to be completed by the user device.

20. The device of claim 6, wherein the one or more processors are further to:

receive data indicating whether the modifications to the one or more fields were authorized or unauthorized;

receive data indicating whether the request associated with the high-risk transaction was authorized or unauthorized;

determine that the authentication procedure was not a best-available authentication procedure, of the group of authentication procedures, based on the data indicating whether the modifications to the one or more fields of the user account were authorized or unauthorized and based on the data indicating whether the request associated with the high-risk transaction was authorized or unauthorized;

determine one or more features to use for retraining the data model by processing additional information associated with the user or the user account,
  wherein the one or more features are able to be used as indicators of authorized or unauthorized actions; and retrain the data model using the one or more features to allow the data model to make more accurate risk score determinations.

* * * * *